(12) United States Patent
Haas

(10) Patent No.: US 12,140,000 B1
(45) Date of Patent: Nov. 12, 2024

(54) NUCLEAR REACTOR INTEGRATED OIL AND GAS PRODUCTION SYSTEMS AND METHODS OF OPERATION

(71) Applicant: Natura Resources LLC, Abilene, TX (US)

(72) Inventor: Derek Haas, Austin, TX (US)

(73) Assignee: Natura Resources LLC, Abilene, TX (US)

( * ) Notice: Subject to any disclaimer, the term of this patent is extended or adjusted under 35 U.S.C. 154(b) by 0 days.

(21) Appl. No.: 18/529,630

(22) Filed: Dec. 5, 2023

Related U.S. Application Data

(63) Continuation of application No. 18/464,968, filed on Sep. 11, 2023, now Pat. No. 12,012,827.

(51) Int. Cl.
| | | |
|---|---|---|
| *E21B 41/00* | (2006.01) | |
| *C01B 3/34* | (2006.01) | |
| *C01C 1/04* | (2006.01) | |
| *C02F 1/00* | (2023.01) | |
| *C02F 103/10* | (2006.01) | |
| *E21B 43/26* | (2006.01) | |
| *G21D 9/00* | (2006.01) | |

(52) U.S. Cl.
CPC ............... *E21B 41/00* (2013.01); *C01B 3/34* (2013.01); *C01C 1/0405* (2013.01); *C02F 1/00* (2013.01); *E21B 43/26* (2013.01); *G21D 9/00* (2013.01); *C01B 2203/0205* (2013.01); *C01B 2203/068* (2013.01); *C01B 2203/0838* (2013.01); *C01B 2203/085* (2013.01); *C01B 2203/1241* (2013.01); *C01B 2203/84* (2013.01); *C02F 2103/10* (2013.01); *C02F 2307/14* (2013.01)

(58) Field of Classification Search
CPC .. C02F 1/16; G21D 1/00; C10G 1/002; E21B 43/2403; E21B 43/20; E21B 49/00; E21B 43/26
See application file for complete search history.

(56) References Cited

U.S. PATENT DOCUMENTS

| | | |
|---|---|---|
| 2,669,465 A | 2/1954 | Newell |
| 3,471,181 A | 10/1969 | Fuentes |
| 3,972,547 A | 8/1976 | Itoya |
| 4,539,846 A | 9/1985 | Grossman |

(Continued)

FOREIGN PATENT DOCUMENTS

| | | |
|---|---|---|
| CA | 2967469 | 9/2023 |
| CA | 3003498 | 1/2024 |

(Continued)

*Primary Examiner* — Zakiya W Bates
(74) *Attorney, Agent, or Firm* — King & Spalding LLP

(57) ABSTRACT

Nuclear energy integrated hydrocarbon operation systems include a well site having a subsurface hydrocarbon well configured to produce a produced water output. The system further includes a deployable nuclear reactor system configured to produce a heat output. The system may further include a deployable desalination unit configured to produce a desalinated water output using the produced water output of the subsurface hydrocarbon well and the heat output of the deployable nuclear reactor. The system may further include a deployable off-gas processing system configured to produce an industrial chemical using the off-gas output of the subsurface hydrocarbon well and the heat output of the deployable nuclear reactor.

15 Claims, 13 Drawing Sheets

(56) References Cited

U.S. PATENT DOCUMENTS

| | | |
|---|---|---|
| 5,016,920 A | 5/1991 | Anderson |
| 5,630,592 A | 5/1997 | Obara et al. |
| 6,125,912 A | 10/2000 | Branagan et al. |
| 6,186,159 B1 | 2/2001 | DeGood |
| 7,160,367 B2 | 1/2007 | Babicki |
| 7,400,697 B1 | 7/2008 | Carmack et al. |
| 7,648,792 B2 | 1/2010 | Kaschmitter |
| 7,707,987 B2 | 5/2010 | Guthrie |
| 7,931,080 B2 | 4/2011 | O'Brien |
| 7,980,304 B2 | 7/2011 | O'Brien |
| 8,186,430 B2 | 5/2012 | O'Brien |
| 8,238,509 B2 | 8/2012 | Moen et al. |
| 8,636,892 B2 | 1/2014 | Koehl et al. |
| 8,703,063 B2 | 4/2014 | Hottovy |
| 8,746,440 B2 | 6/2014 | Williamson et al. |
| 8,767,905 B2 | 7/2014 | Neeley et al. |
| 8,771,482 B2 | 7/2014 | Bailey et al. |
| 8,900,439 B2 | 12/2014 | Wiedmeyer et al. |
| 8,956,524 B2 | 2/2015 | Wiedmeyer et al. |
| 9,008,257 B2 | 4/2015 | Hyde et al. |
| 9,017,527 B2 | 4/2015 | Wiedmeyer et al. |
| 9,074,922 B2 | 7/2015 | Dayal et al. |
| 9,150,975 B2 | 10/2015 | Berger et al. |
| 9,208,909 B2 | 12/2015 | Runkle et al. |
| 9,224,507 B2 | 12/2015 | Heinold et al. |
| 9,251,920 B2 | 2/2016 | Loewen et al. |
| 9,305,673 B2 | 4/2016 | Heinold et al. |
| 9,324,465 B2 | 4/2016 | Splichal, Jr. |
| 9,368,238 B2 | 6/2016 | Theofanous et al. |
| 9,368,241 B2 | 6/2016 | Loewen et al. |
| 9,376,639 B2 | 6/2016 | Walter et al. |
| 9,460,818 B2 | 10/2016 | Bergman |
| 9,475,706 B2 | 10/2016 | Policke et al. |
| 9,522,462 B2 | 12/2016 | Baker et al. |
| 9,691,507 B2 | 6/2017 | Hyde et al. |
| 9,691,508 B2 | 6/2017 | Hyde et al. |
| 9,728,288 B2 | 8/2017 | Hyde et al. |
| 9,748,007 B2 | 8/2017 | Hyde et al. |
| 9,761,336 B2 | 9/2017 | Caine et al. |
| 9,761,337 B2 | 9/2017 | Hyde et al. |
| 9,799,417 B2 | 10/2017 | Hyde et al. |
| 9,875,817 B2 | 1/2018 | Edwards et al. |
| 9,875,818 B2 | 1/2018 | Reed et al. |
| 9,881,700 B2 | 1/2018 | LeBlanc |
| 9,892,807 B2 | 2/2018 | Hyde et al. |
| 9,894,802 B2 | 2/2018 | Loewen et al. |
| 9,911,514 B2 | 3/2018 | Edwards et al. |
| 9,921,158 B2 | 3/2018 | Rider |
| 9,941,025 B2 | 4/2018 | Ahlfeld et al. |
| 10,041,163 B1 | 8/2018 | Offer et al. |
| 10,056,160 B2 | 8/2018 | LeBlanc |
| 10,141,079 B2 | 11/2018 | Czerwinski et al. |
| 10,144,874 B2 | 12/2018 | Walter |
| 10,147,506 B2 | 12/2018 | Malloy, III et al. |
| 10,176,901 B2 | 1/2019 | Loewen |
| 10,197,200 B2 | 2/2019 | Kolb et al. |
| 10,221,499 B2 | 3/2019 | Miller et al. |
| 10,229,757 B2 | 3/2019 | Filippone |
| 10,280,527 B2 | 5/2019 | Loewen et al. |
| 10,290,381 B2 | 5/2019 | Caine et al. |
| 10,311,981 B2 | 6/2019 | Hackett et al. |
| 10,343,102 B2 | 7/2019 | Reasoner |
| 10,438,705 B2 | 10/2019 | Cheatham, III |
| 10,497,479 B2 | 12/2019 | Abbott |
| 10,497,480 B2 | 12/2019 | Cheatham, III et al. |
| 10,515,729 B2 | 12/2019 | Horn et al. |
| 10,535,437 B2 | 1/2020 | Hyde et al. |
| 10,566,096 B2 | 2/2020 | Czerwinski |
| 10,573,416 B2 | 2/2020 | Venneri |
| 10,636,532 B2 | 4/2020 | Anderson et al. |
| 10,643,754 B2 | 5/2020 | Venneri |
| 10,650,934 B2 | 5/2020 | Caine et al. |
| 10,665,356 B2 | 5/2020 | Abbott |
| 10,685,750 B2 | 6/2020 | Eichel et al. |
| 10,734,122 B2 | 8/2020 | Cisneros, Jr. |
| 10,738,367 B2 | 8/2020 | Hackett |
| 10,741,293 B2 | 8/2020 | Abbott |
| 10,755,822 B2 | 8/2020 | Gibbons et al. |
| 10,760,004 B2 | 9/2020 | Garcia-Perez et al. |
| 10,787,609 B2 | 9/2020 | Garcia-Perez et al. |
| 10,787,610 B2 | 9/2020 | Goodrich et al. |
| 10,825,571 B2 | 11/2020 | Edwards et al. |
| 10,867,710 B2 | 12/2020 | Cisneros, Jr. |
| 10,923,238 B2 | 2/2021 | Abbott |
| 10,937,557 B2 | 3/2021 | Sineath et al. |
| 10,962,461 B2 | 3/2021 | Linneen |
| 11,028,303 B2 | 6/2021 | Corbin et al. |
| 11,031,140 B2 | 6/2021 | Hunt et al. |
| 11,043,309 B2 | 6/2021 | Nygaard et al. |
| 11,049,624 B2 | 6/2021 | Loewen et al. |
| 11,075,013 B2 | 7/2021 | Abbott et al. |
| 11,075,015 B2 | 7/2021 | Cisneros, Jr. |
| 11,133,114 B2 | 9/2021 | Hackett et al. |
| 11,136,245 B2 | 10/2021 | Benson |
| 11,145,424 B2 | 10/2021 | Abbott |
| 11,149,623 B2 | 10/2021 | Kutsch |
| 11,170,901 B2 | 11/2021 | Cheatham, III |
| 11,200,991 B2 | 12/2021 | LeBlanc |
| 11,205,523 B2 | 12/2021 | Hyde et al. |
| 11,257,600 B2 | 2/2022 | Anderson et al. |
| 11,264,141 B2 | 3/2022 | Venneri |
| 11,276,503 B2 | 3/2022 | Cisneros, Jr. et al. |
| 11,289,212 B2 | 3/2022 | Inman et al. |
| 11,342,084 B2 | 5/2022 | Cheatham, III et al. |
| 11,342,085 B2 | 5/2022 | Hinds |
| 11,367,536 B2 | 6/2022 | Abbott |
| 11,373,765 B2 | 6/2022 | Czerwinski |
| 11,373,769 B2 | 6/2022 | Hinds |
| 11,380,450 B2 | 7/2022 | Sineath et al. |
| 11,417,435 B2 | 8/2022 | Nelson |
| 11,417,437 B2 | 8/2022 | Venneri |
| 11,424,041 B2 | 8/2022 | Fisher et al. |
| 11,428,564 B2 | 8/2022 | Dayal et al. |
| 11,434,429 B2 | 9/2022 | Goodrich et al. |
| 11,437,156 B2 | 9/2022 | Russell, II et al. |
| 11,443,859 B2 | 9/2022 | Bass et al. |
| 11,482,345 B2 | 10/2022 | Hunt et al. |
| 11,488,731 B2 | 11/2022 | Abbott |
| 11,495,363 B2 | 11/2022 | Gramlichii et al. |
| 11,501,883 B2 | 11/2022 | Eichel et al. |
| 11,542,437 B2 | 1/2023 | Garcia-Perez et al. |
| 11,545,274 B2 | 1/2023 | Bass et al. |
| 11,569,000 B2 | 1/2023 | Hinds |
| 11,574,094 B2 | 2/2023 | Pivovar et al. |
| 11,746,550 B2 | 9/2023 | Bass et al. |
| 11,756,698 B2 | 9/2023 | Reyes et al. |
| 11,842,819 B2 | 12/2023 | Corbin et al. |
| 11,875,906 B2 | 1/2024 | LeBlanc et al. |
| 11,894,155 B2 | 2/2024 | Freeman et al. |
| 11,984,231 B2 | 5/2024 | Keller et al. |
| 11,990,249 B2 | 5/2024 | Cheatham et al. |
| 11,990,815 B2 | 5/2024 | Stubsgaard et al. |
| 11,996,208 B2 | 5/2024 | Callaway et al. |
| 2006/0000007 A1 | 1/2006 | Lin |
| 2007/0001933 A1 | 1/2007 | Hoffmann |
| 2009/0046825 A1 | 2/2009 | Dulka et al. |
| 2009/0173491 A1 | 7/2009 | O'Brien |
| 2010/0258309 A1* | 10/2010 | Ayodele .............. E21B 43/243 |
| | | 166/272.3 |
| 2012/0012330 A1 | 1/2012 | Botich |
| 2012/0082911 A1 | 4/2012 | Hyde et al. |
| 2012/0082913 A1 | 4/2012 | Hyde et al. |
| 2012/0087455 A1 | 4/2012 | Hyde et al. |
| 2013/0083878 A1 | 4/2013 | Massie et al. |
| 2014/0185733 A1 | 7/2014 | Povirk et al. |
| 2015/0228363 A1 | 8/2015 | Dewan et al. |
| 2015/0310948 A1 | 10/2015 | Venneri |
| 2016/0189812 A1 | 6/2016 | Czerwinski |
| 2016/0189813 A1 | 6/2016 | Cisneros, Jr. |
| 2016/0217874 A1 | 7/2016 | Dewan et al. |
| 2016/0272903 A1 | 9/2016 | Walter et al. |
| 2017/0206984 A1 | 7/2017 | Lee et al. |
| 2017/0271033 A1 | 9/2017 | Dodson et al. |
| 2017/0292179 A1 | 10/2017 | Hackett |

(56) References Cited

U.S. PATENT DOCUMENTS

| | | |
|---|---|---|
| 2017/0294240 A1 | 10/2017 | Baglietto et al. |
| 2017/0294241 A1 | 10/2017 | Dodson et al. |
| 2017/0301413 A1 | 10/2017 | Cisneros, Jr. |
| 2017/0301418 A1 | 10/2017 | Dodson et al. |
| 2017/0316840 A1 | 11/2017 | Abbott |
| 2018/0030576 A1 | 2/2018 | Urza |
| 2018/0244535 A1 | 8/2018 | Russell, II et al. |
| 2018/0254109 A1 | 9/2018 | Cheatham, III et al. |
| 2018/0322968 A1 | 11/2018 | Cheatham, III et al. |
| 2019/0035510 A1 | 1/2019 | LeBlanc |
| 2019/0057783 A1 | 2/2019 | LeBlanc |
| 2019/0066857 A1 | 2/2019 | Hackett et al. |
| 2019/0139665 A1 | 5/2019 | Czerwinski et al. |
| 2019/0203614 A1 | 7/2019 | Loewen et al. |
| 2019/0371482 A1 | 12/2019 | Benson |
| 2020/0027581 A1 | 1/2020 | Hackett et al. |
| 2020/0087156 A1 | 3/2020 | Kelleher |
| 2020/0122109 A1 | 4/2020 | Kruizenga et al. |
| 2020/0161015 A1 | 5/2020 | Czerwinski et al. |
| 2020/0373024 A1 | 11/2020 | Gramlich |
| 2020/0393123 A1 | 12/2020 | Aly |
| 2021/0047199 A1 | 2/2021 | Russell, II et al. |
| 2021/0047568 A1 | 2/2021 | Goodrich et al. |
| 2021/0095645 A1 | 4/2021 | Cheatham, III |
| 2021/0130181 A1 | 5/2021 | Brown et al. |
| 2021/0170676 A1 | 6/2021 | Kitchen et al. |
| 2021/0210224 A1 | 7/2021 | Cisneros, Jr. |
| 2021/0272707 A1 | 9/2021 | Wardle |
| 2021/0272708 A1 | 9/2021 | Cisneros, Jr. |
| 2021/0287814 A1 | 9/2021 | Loewen et al. |
| 2021/0302295 A1 | 9/2021 | Linneen |
| 2021/0304909 A1 | 9/2021 | Gramlich et al. |
| 2021/0313081 A1 | 10/2021 | Nygaard et al. |
| 2021/0318673 A1 | 10/2021 | Kitchen et al. |
| 2021/0319920 A1 | 10/2021 | Nelson |
| 2021/0343431 A1 | 11/2021 | Cisneros, Jr. |
| 2022/0005619 A1 | 1/2022 | Cisneros, Jr. |
| 2022/0017382 A1 | 1/2022 | Russell, II et al. |
| 2022/0051814 A1 | 2/2022 | Freeman et al. |
| 2022/0051816 A1 | 2/2022 | Freeman |
| 2022/0051817 A1 | 2/2022 | Hejzlar et al. |
| 2022/0051818 A1 | 2/2022 | Cisneros, Jr. |
| 2022/0051820 A1 | 2/2022 | Corbin |
| 2022/0068512 A1 | 3/2022 | Russell, II et al. |
| 2022/0081317 A1 | 3/2022 | Russell, II et al. |
| 2022/0115149 A1 | 4/2022 | Barringer et al. |
| 2022/0115150 A1 | 4/2022 | Hackett et al. |
| 2022/0115152 A1 | 4/2022 | Barringer et al. |
| 2022/0139576 A1 | 5/2022 | Inman et al. |
| 2022/0139577 A1 | 5/2022 | Cisneros, Jr. et al. |
| 2022/0139578 A1 | 5/2022 | Venneri et al. |
| 2022/0250936 A1 | 8/2022 | Benson |
| 2022/0254524 A1 | 8/2022 | Cheatham, III et al. |
| 2022/0301729 A1 | 9/2022 | Cisneros, Jr |
| 2022/0301732 A1 | 9/2022 | Cisneros, Jr. et al. |
| 2022/0310278 A1 | 9/2022 | Choi et al. |
| 2022/0310281 A1 | 9/2022 | Czerwinski |
| 2022/0324066 A1 | 10/2022 | Argentine |
| 2022/0328202 A1 | 10/2022 | Venneri et al. |
| 2022/0328203 A1 | 10/2022 | Bass et al. |
| 2022/0328205 A1 | 10/2022 | Bass et al. |
| 2022/0336118 A1 | 10/2022 | Corbin et al. |
| 2022/0351870 A1 | 11/2022 | Fisher et al. |
| 2022/0363995 A1 | 11/2022 | Goodrich et al. |
| 2022/0375635 A9 | 11/2022 | LeBlanc |
| 2023/0024338 A1 | 1/2023 | Reed et al. |
| 2023/0096162 A1 | 3/2023 | Loewen et al. |
| 2023/0104365 A1 | 4/2023 | Eichel et al. |
| 2023/0290528 A1 | 9/2023 | Venneri et al. |
| 2023/0317306 A1 | 10/2023 | Botha et al. |
| 2023/0323695 A1 | 10/2023 | Johnson et al. |
| 2023/0326619 A1 | 10/2023 | Snead et al. |
| 2023/0377763 A1 | 11/2023 | Botha et al. |
| 2023/0392274 A1 | 12/2023 | Harb et al. |
| 2023/0395270 A1 | 12/2023 | Benson et al. |
| 2024/0013936 A1 | 1/2024 | Kim et al. |
| 2024/0017212 A1 | 1/2024 | Miller et al. |
| 2024/0035119 A1 | 2/2024 | Tilton et al. |
| 2024/0112822 A1 | 4/2024 | Lucas et al. |
| 2024/0120118 A1 | 4/2024 | Aleshin et al. |
| 2024/0124985 A1 | 4/2024 | Tsang et al. |
| 2024/0246023 A1 | 7/2024 | Tsang et al. |

FOREIGN PATENT DOCUMENTS

| | | |
|---|---|---|
| CA | 3018050 | 5/2024 |
| CN | 102878109 | 11/2014 |
| CN | 104214420 | 12/2014 |
| CN | 102937090 | 4/2015 |
| CN | 104862531 | 8/2015 |
| CN | 105060914 | 11/2015 |
| CN | 106425315 | 2/2017 |
| CN | 105334138 | 1/2018 |
| CN | 106180254 | 6/2018 |
| CN | 108151567 | 6/2018 |
| CN | 108172318 | 6/2018 |
| CN | 108389634 | 8/2018 |
| CN | 108511088 | 9/2018 |
| CN | 108520785 | 9/2018 |
| CN | 207850147 | 9/2018 |
| CN | 108624839 | 10/2018 |
| CN | 107034386 | 11/2018 |
| CN | 107130242 | 3/2019 |
| CN | 109509562 | 3/2019 |
| CN | 106840765 | 4/2019 |
| CN | 109671510 | 4/2019 |
| CN | 105976879 | 5/2019 |
| CN | 108198635 | 7/2019 |
| CN | 110042434 | 7/2019 |
| CN | 108206065 | 9/2019 |
| CN | 109022921 | 9/2019 |
| CN | 107469628 | 10/2019 |
| CN | 107945887 | 10/2019 |
| CN | 108389632 | 10/2019 |
| CN | 109234573 | 10/2019 |
| CN | 209496626 | 10/2019 |
| CN | 110783010 | 2/2020 |
| CN | 110842494 | 2/2020 |
| CN | 210039648 | 2/2020 |
| CN | 107238627 | 3/2020 |
| CN | 108167195 | 7/2020 |
| CN | 111508627 | 8/2020 |
| CN | 211742680 | 10/2020 |
| CN | 112111251 | 12/2020 |
| CN | 112284170 | 1/2021 |
| CN | 112322939 | 2/2021 |
| CN | 110549697 | 4/2021 |
| CN | 112609195 | 4/2021 |
| CN | 212934166 | 4/2021 |
| CN | 110444311 | 5/2021 |
| CN | 112778012 | 5/2021 |
| CN | 108417277 | 6/2021 |
| CN | 110695091 | 6/2021 |
| CN | 113202780 | 8/2021 |
| CN | 113369652 | 9/2021 |
| CN | 214529256 | 10/2021 |
| CN | 113630582 | 11/2021 |
| CN | 113658722 | 11/2021 |
| CN | 111334258 | 12/2021 |
| CN | 111421913 | 12/2021 |
| CN | 113744900 | 12/2021 |
| CN | 113851233 | 12/2021 |
| CN | 214998262 | 12/2021 |
| CN | 113936820 | 1/2022 |
| CN | 113990535 | 1/2022 |
| CN | 111627571 | 2/2022 |
| CN | 113061781 | 2/2022 |
| CN | 114074234 | 2/2022 |
| CN | 114093529 | 2/2022 |
| CN | 215770541 | 2/2022 |
| CN | 111057993 | 3/2022 |
| CN | 114774738 | 7/2022 |
| CN | 112228853 | 8/2022 |
| CN | 112259263 | 8/2022 |

(56) References Cited

FOREIGN PATENT DOCUMENTS

| | | |
|---|---|---|
| CN | 112530614 | 8/2022 |
| CN | 114917603 | 8/2022 |
| CN | 114927242 | 8/2022 |
| CN | 111627572 | 9/2022 |
| CN | 111945171 | 9/2022 |
| CN | 112174670 | 9/2022 |
| CN | 115050490 | 9/2022 |
| CN | 115076479 | 9/2022 |
| CN | 111739665 | 10/2022 |
| CN | 112992389 | 11/2022 |
| CN | 115351276 | 11/2022 |
| CN | 112587989 | 12/2022 |
| CN | 113241200 | 12/2022 |
| CN | 115436402 | 12/2022 |
| EP | 3563389 | 7/2021 |
| EP | 3646344 | 10/2023 |
| EP | 4022649 | 12/2023 |
| EP | 4297043 | 12/2023 |
| EP | 4052274 | 2/2024 |
| EP | 4314687 | 2/2024 |
| EP | 4348684 | 4/2024 |
| EP | 4352750 | 4/2024 |
| EP | 4354460 | 4/2024 |
| WO | WO 2013077941 | 10/2013 |
| WO | WO 2014039641 | 6/2014 |
| WO | WO 2015017928 | 2/2015 |
| WO | WO 2015094450 | 10/2015 |
| WO | WO 2017032379 | 3/2017 |
| WO | WO 2017059360 | 4/2017 |
| WO | WO 2017192607 | 11/2017 |
| WO | WO 2018009433 | 1/2018 |
| WO | WO 2018013317 | 1/2018 |
| WO | WO 20180311 | 2/2018 |
| WO | WO 2017199059 | 2/2018 |
| WO | WO 2018026429 | 3/2018 |
| WO | WO 2018042216 | 4/2018 |
| WO | WO 2018064572 | 4/2018 |
| WO | WO 2018071081 | 5/2018 |
| WO | WO 2018084940 | 6/2018 |
| WO | WO 2018213669 | 1/2019 |
| WO | WO 2019152595 | 8/2019 |
| WO | WO 2019226218 | 1/2020 |
| WO | WO 2019231971 | 1/2020 |
| WO | WO 2020123513 | 8/2020 |
| WO | WO 2021151055 | 7/2021 |
| WO | WO 2021133952 | 9/2021 |
| WO | WO 2022022792 | 2/2022 |
| WO | WO 2022039795 | 2/2022 |
| WO | WO 2022039893 | 2/2022 |
| WO | WO 2022040116 | 3/2022 |
| WO | WO 2022061195 | 4/2022 |
| WO | WO 2022146446 | 7/2022 |

* cited by examiner

NUCLEAR REACTOR INTEGRATED OIL AND GAS PRODUCTION SYSTEMS AND METHODS OF OPERATION

CROSS REFERENCE TO RELATED APPLICATION

This application is a continuation application of U.S. patent application Ser. No. 18/464,968, filed Sep. 11, 2023, which is incorporated herein in its entirety.

TECHNICAL FIELD

The described examples relate generally to systems, devices, and techniques for nuclear energy integrated oil and gas operations.

BACKGROUND

Oil and gas operations may include the production of certain hydrocarbons from subsurface reservoirs using wells that are drilled into the reservoir. In some cases, hydrocarbons may be produced from the subsurface reservoir using one or more enhanced recovery operations, including hydraulic fracturing. Broadly, hydraulic fracturing uses a pressurized fluid (often including a fracturing slurry composed of water, a proppant, and a chemical additive) that is injected into the subsurface reservoir—"production zone"—to increase a permeability of the reservoir, and thereby support the flow of hydrocarbons therein to the surface. Hydrocarbon well drilling, completion, production, fracturing, and/or other associated operations (collectively, "hydrocarbon operations") often requires a substantial input of electrical power, e.g., to support the operation of pumps, compressors, drilling equipment, mixers, accumulators, and other equipment. Diesel generators can provide such power needs, but can be costly and unreliable. Hydrocarbon production operations may further generate substantial quantities of off-gas or casing gas (e.g., methane—$CH_4$) and/or produced water (e.g., a recirculated fluid from the well casing and/or other fluid that is cut from produced hydrocarbon) that may represent potential waste streams. Conventional techniques for dealing with off-gas and produced water include flaring and waste-water well injection, respectively, among other techniques. However, flaring and waste-water injection techniques both fail to repurpose the waste stream for further commercial or industrial use, and regardless, such repurposing generally requires a substantial energy input. Conventional nuclear energy systems are known for affordable, clean, and reliable energy; however, such conventional systems may be impractical or infeasible for use in support of hydrocarbon operations. Accordingly, there is a need for systems and techniques to support the power consumption and waste stream processing needs of hydrocarbon operations, such as by leveraging nuclear energy systems.

SUMMARY

In one example, a system is disclosed. The system includes a well site having a subsurface hydrocarbon well configured to produce a produced water output. The system further includes a deployable nuclear reactor system configured to produce a heat output. The system further includes a deployable desalination unit configured to produce a desalinated water output using the produced water output of the subsurface hydrocarbon well and the heat output of the deployable nuclear reactor and/or an electrical output derived therefrom.

In another example, the well site includes a hydraulic fracturing system configured to introduce pressurized fluids into the subsurface hydrocarbon well. The produced water output may at least partially include a recirculated form of the pressurized fluids.

In another example, the pressurized fluid may include a fracturing fluid slurry including one or more of a water, a proppant, and a chemical additive.

In another example, the system further includes a desalinated water offtake network having a network of temporary piping configured to deliver the desalinated water output to one or more municipalities adjacent the well site.

In another example, the system further includes a produced water pond configured to receive the produced water output and hold the produced water output for processing. The deployable desalination unit may be configured to receive the produced water output form the produced water pond.

In another example, the subsurface hydrocarbon well may be configured to produce an off-gas output. In this regard, the system may further include a deployable off-gas processing system configured to produce an industrial chemical using the off-gas output of the subsurface hydrocarbon well and the heat output of the deployable nuclear reactor and/or an electrical output derived therefrom.

In another example, the deployable off-gas processing system may include a deployable hydrogen production unit configured to produce a hydrogen output using the off-gas output of the subsurface hydrocarbon well and the heat output of the deployable nuclear reactor and/or an electrical output derived therefrom.

In another example, the deployable off-gas processing system may include a deployable chemical production unit configured to produce the industrial chemical using the hydrogen output of the hydrogen production module and the heat output of the deployable nuclear reactor and/or an electrical output derived therefrom.

In another example, the industrial chemical may include ammonia.

In another example, the deployable hydrogen production unit may include a steam methane refining processing unit. Further, the deployable chemical production unit may include a Haber-Bosch processing unit and/or a Fischer-Tropsch processing unit.

In another example, the system may further include a deployable electrical generation unit configured to produce an electrical power output using the heat output from the deployable nuclear reactor. In this regard, the well site may include one or more hydraulic fracturing systems, drilling systems, completion systems, or productions systems that are powered by the electrical power output of the deployable electrical generation unit.

In another example, a micro-grid is disclosed. The micro-grid includes a plurality of well sites clustered in a first geographic location. Each well site of the plurality of well sites may include a subsurface hydrocarbon well configured to produce a produced water output and an off-gas output. The micro-grid further includes a deployable plant deployed proximal the first geographic location. The deployable plant may further include a deployable nuclear reactor system configured to produce a heat output. The micro-grid may further include a network of pipes configured to deliver the produced water output and the off-gas output from each well site of the plurality of well sites to the deployable plant. The deployable plant may be configured to produce a desalinated water output and an industrial chemical output using the produce water output and the off-gas output, respectively, and the heat output from the nuclear reactor system and/or an electrical output derived therefrom.

In another example, the deployable plant may further include a deployable electrical generation unit configured to produce an electrical power output using the heat output from the deployable nuclear reactor. Further, the micro-grid may include a network of power lines configured to deliver the electrical power output to each well site of the plurality of well sites. The electrical power may be adapted to power at said well site one or more hydraulic fracturing systems, drilling systems, completion systems, or productions systems.

In another example, the plant may further include a deployable desalination unit. The plant may further include a deployable hydrogen production unit configured to perform steam methane refining. The plant may further include a deployable chemical production unit configured to perform a Haber-Bosch process and/or a Fischer-Tropsch process.

In another example, the micro-grid may include a second plurality of well sites clustered in a second geographic location. Each well site of the second plurality of well sites may include a subsurface hydrocarbon well configured to produce a produced water output and an off-gas output. The deployable plant may be redeployable proximal the second geographic location. The deployable plant may further be configured to produce a desalinated water output and an industrial chemical output using the produce water output and the off-gas output, respectively, of the second plurality of well sites and the heat output from the nuclear reactor system and/or an electrical output derived therefrom.

In another example, a method of treating an output of a well site using nuclear reactors is disclosed. The method includes operating a well site. The well site has a subsurface hydrocarbon well. The method further includes producing a produced water output from the hydrocarbon well. The method further includes operating a deployable plant deployed proximal to the well site. The deployable plant has a deployable nuclear reactor system and a deployable desalination unit. The method further includes producing a heat output from the deployable nuclear reactor system. The method further includes producing a desalinated water output from the desalination unit using the produced water output of the subsurface hydrocarbon well and the heat output of the nuclear reactor system and/or an electrical output derived therefrom.

In another example, the deployable plant may include a deployable electrical generation unit. Accordingly, the method may further include producing an electrical power output from the deployable electrical generation unit using the heat output from the deployable nuclear reactor system. The well site may include one or more hydraulic fracturing systems, drilling systems, completion systems, or productions systems. In this regard, the method may further include powering one or more of the hydraulic fracturing systems, drilling systems, completion systems, or productions systems using the electrical power output from the deployable electrical generation unit.

In another example, the method may further include producing an off-gas output from the subsurface hydrocarbon well. The deployable plant may further include a deployable hydrogen production unit and a deployable chemical production unit. Accordingly, the method may further include producing, by the deployable hydrogen production unit, a hydrogen output by performing a steam methane refining process using the off-gas output from the subsurface hydrocarbon well and the heat output from the deployable nuclear reactor and/or an electrical output derived therefrom. Further, the method may include producing, by the deployable chemical production unit, a chemical output by performing a Haber-Bosch processing using the hydrogen output from the deployable hydrogen production unit and the heat output from the deployable nuclear reactor unit and/or an electrical output derived therefrom.

In another example, operating the well site may further include performing one or more hydraulic fracturing operations that includes introducing pressurized fluids into the subsurface hydrocarbon well.

In another example, the produced water output may at least partially include a recirculated from of the pressurized fluids. The pressurized fluid may include a fracturing fluid slurry including one or more of a water, a proppant, and a chemical additive.

In another example, a system is disclosed. The system includes well site having a subsurface hydrocarbon well configured to produce an off-gas output. The system further includes a deployable nuclear reactor system configured to produce a heat output. The system further includes a deployable off-gas processing system configured to produce an industrial chemical using the off-gas output of the subsurface hydrocarbon well and the heat output of the deployable nuclear reactor and/or an electrical output derived therefrom.

In another example, the deployable off-gas processing system may further include a deployable hydrogen production unit configured to produce a hydrogen output using the off-gas output of the subsurface hydrocarbon well and the heat output of the deployable nuclear reactor and/or an electrical output derived therefrom.

In another example, the deployable off-gas processing system may further include a deployable chemical production unit configured to produce the industrial chemical using the hydrogen output of the hydrogen production module and the heat output of the deployable nuclear reactor and/or an electrical output derived therefrom.

In another example, the industrial chemical includes ammonia.

In addition to the example aspects described above, further aspects and examples will become apparent by reference to the drawings and by study of the following description.

Figure 1:
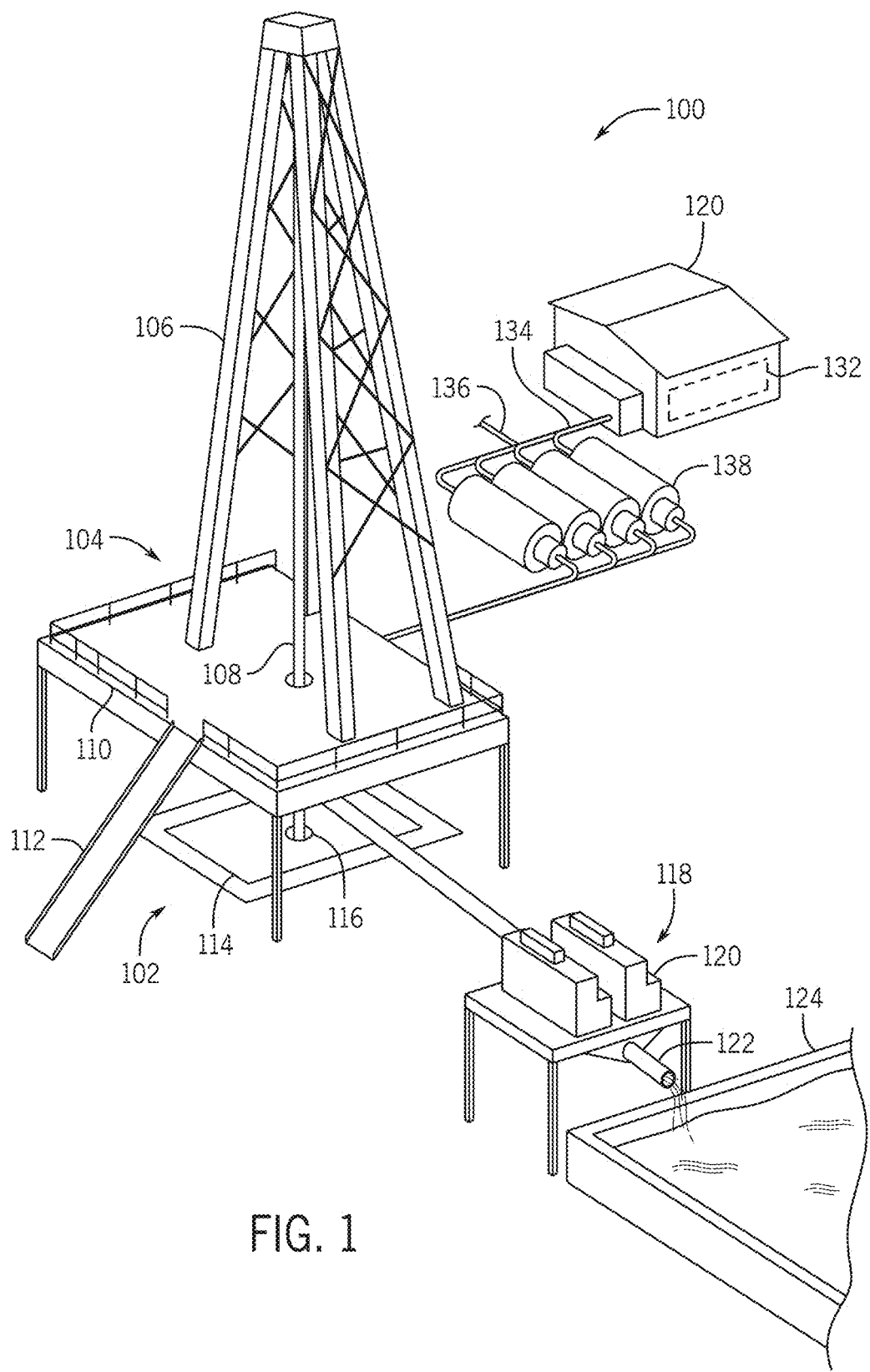
FIG. 1 depicts an example oil and gas drilling site.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to nuclear reactor integrated oil and gas production systems and methods of operation. Oil and gas production systems, or "hydrocarbon operations" may generally include any operations associated with extracting hydrocarbons (e.g., oil and gas) from a subsurface reservoir, including, without limitation, well site preparation, well drilling, completion, production, enhanced recovering operations including hydraulic fracturing and/or other associated operations. Broadly, hydrocarbon operations often require a substantial input of electrical power, including for the operation of pumps, compressors, drilling equipment, mixers, accumulators, controls and actuators, and any other associated equipment. Diesel generators can provide such power needs, but can be costly and unreliable. Hydrocarbon operations may further generate substantial quantities of off-gas or casing gas (e.g., methane—$CH_4$) and/or produced water (e.g., a recirculated fluid from the well casing and/or other fluid that is cut from produced hydrocarbon) that may represent potential waste streams. Conventional techniques for dealing with off-gas and produced water include flaring and waste-water well injection, respectively, among other techniques. However, flaring and waste-water injection techniques both fail to repurpose the waste stream for further commercial or industrial use, and regardless, such repurposing generally requires a substantial energy input.

To mitigate these and other challenges associated with hydrocarbon operations, the systems and methods of the present disclosure integrate a nuclear reactor system into such hydrocarbon operations. For example, a nuclear reactor system may include an integral-type reactor, which is generally a deployable, modular unit that is capable of generating thermal energy from fission reactions. Such integral-type reactor may be a fully contained or standalone unit that is transportable to a first remote site (such as a hydrocarbon well site) at which the reactor may operate for a period of time, and may be subsequently redeployed to a second remote site for operation, upon conclusion of the operations at the first remote site. Integral-type or "deployable reactors" of the present disclosure may include substantially any type of nuclear reactor, including, without limitation, certain molten salt reactors, super critical water reactors, liquid sodium cooled reactors, helium or other gas cooled reactors, liquid metal cooled reactors, certain pressurized water reactors, among others.

The deployable reactors of the present disclosure may be used to provide for the thermal and electrical needs of the various hydrocarbon operations described herein. Further, the deployable reactors may be used to treat and/or repurpose one or more waste streams of the hydrocarbon operations, including treating and/or repurposing off-gas and/or produced water. For example, the deployable nuclear reactor may be used to produce ammonia ($NH_3$) or other chemical product from the off-gas using one or more heat or electrical outputs derived from the fission reactions of the reactor. Further, the deployable nuclear reactor may be used to produce desalinated water from the produced water also using one or more heat or electrical outputs derived from the fission reactions of the reactor. In other cases, the waste streams of the hydrocarbon operations may be repurposed into different products.

To facilitate the foregoing, in one example, disclosed herein is a deployable plant including the deployable nuclear reactor. The deployable plant may be deployable to a hydrocarbon well or more generally to any region proximal a cluster of well sites. For example, the entire deployable plant may be capable of remote deployment and redeployment to any number of locations. In this regard, the deployable plant may include a plurality of trucks, tractor-trailers, and/or other moveable skids or components that are readily transportable between locations. One such tractor-trailer or moveable skid may include the deployable nuclear reactor. Other tractor-trailer or moveable skids may include one or more of a deployable desalination unit, a deployable electrical generation unit, a deployable hydrogen production unit, a deployable chemical production unit, and/or other deployable equipment, including certain equipment to facilitate the offtake of desalinated water, electricity, and/or chemical produced using the various deployable units.

In operation, such deployable plant may be configured to receive one or both of a produced water input or a casing gas input from certain hydrocarbon operations. In one example, the deployable plant may use the deployable desalination unit to produce desalinated water using the produced water input of the hydrocarbon operations and a heat output from the deployable nuclear reactor of the deployable plant. In another example, the deployable plant may use the deployable hydrogen production unit to produce hydrogen using the casing gas input of the hydrocarbon operations and a heat output from the deployable nuclear reactor. In another example, the deployable plant may use the deployable chemical production unit to produce a chemical output (e.g., ammonia, $NH_3$) from the produced hydrogen of the deployable hydrogen production unit and a heat output from the deployable nuclear reactor (e.g., via a Haber-Bosch process, a Fischer-Tropsch process and/or other process). In another example, the deployable plant may use the deployable electrical generation unit to produce an electricity output from a heat output of the deployable nuclear reactor. Such electricity output may, in turn, be used to power one or more hydrocarbon operations, among other uses.

While many types of integral, or deployable-type nuclear reactors are possible and contemplated herein, in one example, the deployable nuclear reactor system includes an integral molten salt reactor ("MSR"). Broadly, an integral MSR may reduce or eliminate leaks and/or other failure mechanisms by fully enclosing the functional components (e.g., the heat exchanger, the reactor core, the pump (if used), and so on) within a common, integrally constructed vessel. For example, an integral MSRs may house a reactor core and one or more heat exchangers in a "critical region" of a common vessel, and cause a fuel salt to circulate within the common vessel between the reactor core (at which the fuel salt may undergo a fission reaction that heats the salt) and a heat exchanger (at which the heat is removed from the fuel salt). The heat that is removed from the salt may be used for or may form the various "heat outputs" of the deployable nuclear reactor described above that are provided to the deployable desalination unit, the deployable electrical generation unit, the deployable hydrogen production unit, and/or the deployable chemical production unit. In some cases, as described herein, the integral MSR may further include a subcritical region at which the fuel salt may be kept away from the reactor core and heat exchanger in a subcritical state, as may be needed to facilitate shutdown of the integral MSR. In other configurations, other components and features of the integral MSR are contemplated herein.

Turning to the Drawings, FIG. 1 depicts example hydrocarbon operations 100 for purposes of illustration. As used herein, "hydrocarbon operations" includes all types of oil and gas recovery and associated operations, including, without limitation, well site preparation, well drilling, completion, production, enhanced recovering operations including hydraulic fracturing, and/or other associated operations-any one of which, may be integrated with, and supported by, the various nuclear reactor systems described herein. In the example of FIG. 1, the example hydrocarbon operations 100 are shown as including an example drilling operation that utilizes a nuclear reactor system to support one or more thermal or electrical needs of the system. For example, FIG. 1 shows a well site 102 having a rig 104 positioned thereon. The rig 104, shown schematically, includes a rig mast 106, a drive 108, an elevated platform 110, and a pipe ramp 112. The well site 102 arranged generally below the elevated platform 110 may include a hydrocarbon well 114 (e.g., a well potentially capable of producing some form of an oil or a gas product) and a blowout preventer 116 that is generally coupled to the drive 108.

In operation, the rig 104 may use the drive 108 to push a drill head (not shown) through hydrocarbon well 114 in order to clear a well bore in a subsurface hydrocarbon reservoir below. The rig 104 and/or other associated rigs (e.g., a completions rig) may subsequently engage in one or more completion operations in order to prepare the well bore for hydrocarbon production. For example, a cement liner may be poured to establish an impermeable annulus about the well bore for some or all of a depth of the well. Additionally, metal casing and other equipment may be put into the well bore, which may further serve to establish flow paths for hydrocarbons produced by the well, in addition to establishing certain flow paths for off-gas, and/or other produced fluids of the well 114. As described in greater detail herein in reference to FIGS. 3 and 4, enhanced recovery operations, including fracking operations may be used to induce a flow of hydrocarbon from the well 114.

With continued reference to FIG. 1, the drilling operations may produce a volume of water, mud, and/or other debris. The system 100 of FIG. 1 is shown as including schematically a separator system 118, a mud gas separator 120, an emitting pipe 122, and a reserve pit 124. Broadly, the separator system 118 includes any appropriate equipment to route produced materials (water, mud, gas) away from the well site 114 and upon removing gas therefrom, to dispose of said items in the reserve pit 124. More generally, the reserve pit 124 may be any surface containment structure that is configured to hold one or more waste streams from the hydrocarbon well, including waste streams from drilling, completion, or production operations. In many cases, the reserve pit 124 is formed from an earthen trench dug into the ground and lined with a synthetic, impermeable material to prevent seepage of any liquids into the ground. Accordingly, while the reserve pit 124 is depicted for purposes of illustration in FIG. 1 as being associated with drilling operations, it will be appreciated that the reserve pit 124 may be used to capture substantially any liquid waste stream from hydrocarbon operations, including produced water and/or a recirculated form of fracturing fluid, among other waste streams.

FIG. 1 further shows schematically certain equipment that may be used in conjunction with the drilling operations 100, including a generator system 130, pumps 138, and electrical conduits 134, 136. The pumps 136 are one example type of equipment that may require electrical power in order to operate and support the drilling of the well site 102. For example, the pumps 136 may provide a critical pressurized flow of fluids (including mud) to the drilling site in order for the drive 108 to successfully cause the drill head to drill or clear out the well bore. In other examples, other types of equipment may be present, including accumulators, compressors, sensors, actuators, control rooms and the like, based on a stage of operation of the hydrocarbon operations. The pumps 138 any other equipment may be electrically powered by power generated at the generator system 130. In convention systems, the generator system 130 may include a bank of diesel generators and/or a connection to a local power grid. The generator system 130 may in addition to or in the alternative, include an integral MSR 132. The integral MSR 132 may generally be any deployable nuclear reactor system, as defined herein, that is capable of producing a heat output generated from fission reactors that occur therein. In the example of FIG. 1, the integral MSR 132 is shown schematically as transmitting an electrical output to pumps 138 through conduit 134, and more generally to any other equipment of the system via the system connection 136. Additionally or alternatively, the integral MSR 132 may further be used to provide a heat output to various other deployable components (e.g., such as a deployable desalination unit, deployable electrical generator unit, deployable hydrogen production unit, and/or deployable chemical production unit, if utilized.)

Figure 2:
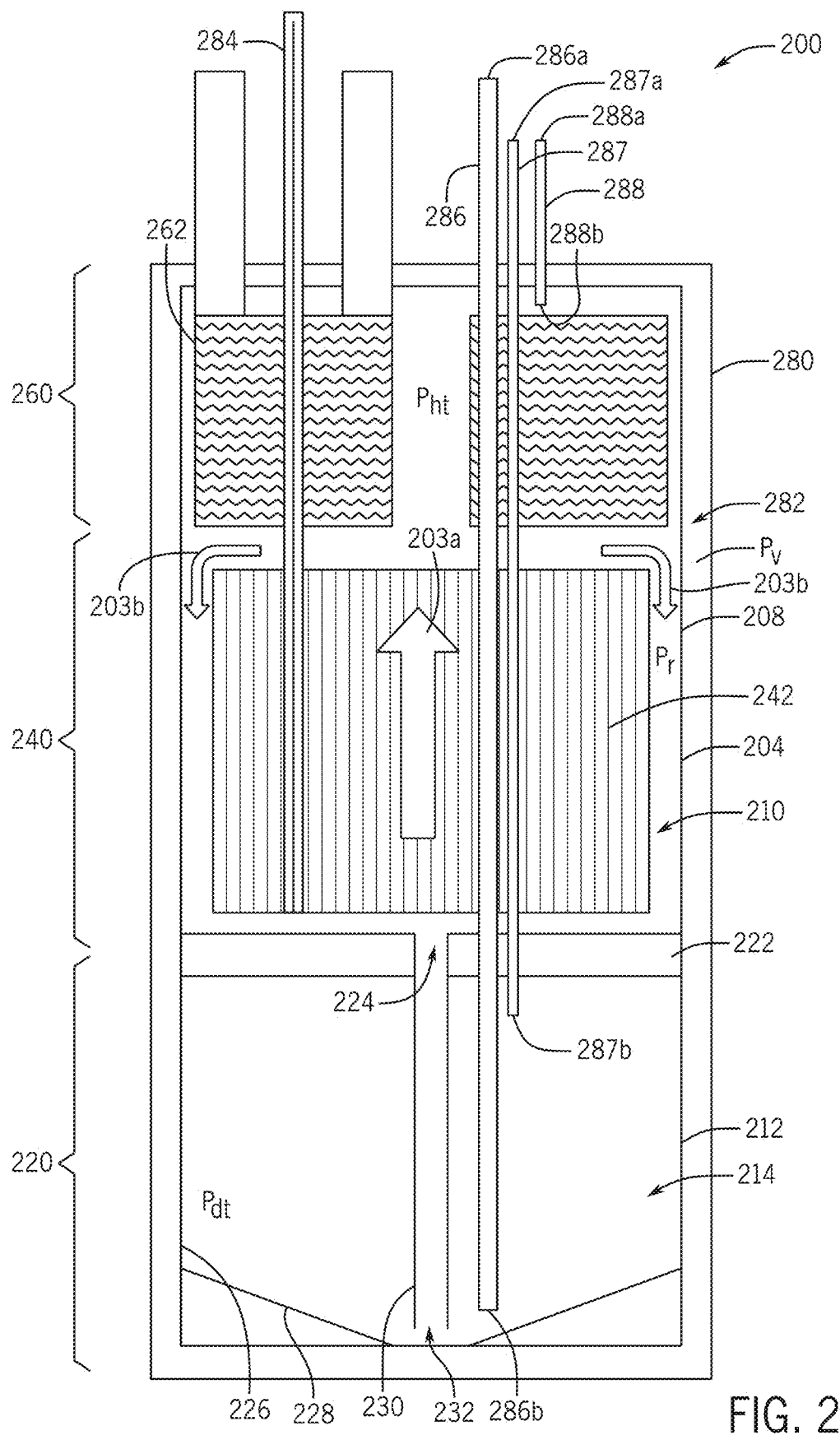
FIG. 2 depicts an example integral molten salt reactor.

Turning to FIG. 2, one example deployable nuclear reactor is shown for purposes of illustration, an integral MSR 200. The integral MSR 200 may be or be associated with the integral MSR 132 described above in relation to FIG. 1 and/or any of the deployable MSRs described herein. Broadly, the integral MSR 200 may include an integrally constructed vessel 204, a critical region 208, a critical volume 210, a subcritical region 212, a subcritical volume 214, a drain tank section 220, an internal barrier 222, a fuel salt passage 224, a reactor section 240, and a heat exchange section 260. The common, integrally constructed vessel 204 may define both the critical region 208 and a subcritical region 212. The critical region 208 may define a critical volume 210 for the circulation of fuel salt (e.g., a carrier salt including a fissionable material, such as LiF—BeF$_2$—UF$_4$) and for the housing of fission reactions occurring therein. Further, the subcritical region 212 may define a subcritical volume 214 for the storage of fuel salt away from a reactor core or otherwise away from the critical region 204.

As generally shown in FIG. 2, the critical region 208 may circulate fuel salt along a circulation flow path therein including a flow 203a through a reactor section 240 where the fuel salt may generally be heated due to fission reactions occurring therein. As further shown in FIG. 2, the critical region 208 may circulate the fuel salt along a circulation path therein including a flow 203b through a heat exchange section 260 and back to the reactor section 240 for recirculation via the flow 203a. At the heat exchange section 260, heat may be removed from the fuel salt in order to circulate a cooler fuel salt back to the reactor section 240 so that the fuel salt may again be heated along the flow 203a. The circulation of the fuel salt along the flows 203a, 203b may proceed continuously in order to provide a generally constant, steady stream of heat from the fission reactions to the heat exchangers of the integral MSR 200.

The integrally constructed vessel 204 is shown in FIG. 2 as including the subcritical region 212 therein, which may establish a drain tank section 220 of the integral MSR 200. Accordingly, the integral MSR 200 may be operable to maintain fuel salt in both a critical state, and a subcritical state, within the same, integrally constructed vessel 204. The subcritical volume 214 of the subcritical region 212 is shown separated from the critical volume 210 by an internal barrier 222. The internal barrier 222 may further define a fuel salt passage 224 therethrough in order to establish a flow path for the fuel salt between the critical volume 210 and the subcritical volume 214.

Fuel salt may be selectively held within the critical volume 210 and/or the subcritical volume 214 based on the maintenance of an inert gas pressure within each volume. For example, the critical volume 210 may be held at a pressure $P_r$ (reactor section pressure) or $P_{ht}$ (heat exchange section pressure) and the subcritical volume 214 may be held at a pressure $P_{dt}$ (drain tank section pressure). In the example of FIG. 2, where fuel salt may be circulated in the critical region 208, the integral MSR 200 may operate to maintain the pressure $P_{dt}$ at a value that is greater than the pressures $P_r$, $P_{ht}$. Accordingly, the fuel salt passage 224 may be pressurized to mitigate or prevent the introduction of fuel salt into the subcritical volume 214. As described herein, the pressures $P_{dt}$, $P_r$, $P_{ht}$ may be manipulated in various manners in order to control the disposition of the fuel salt between the critical region 208 and the subcritical region 212.

FIG. 2 further shows additional implementation details of the integral MSR 200 for purposes of example. As shown in FIG. 2, the integral MSR 200 includes an outer container 280. The outer container 280 may be used to define a containment space about the vessel 204. For example, the outer container 280 may be configured to fully receive the vessel 204 and define a thermal barrier between the vessel 204 and an external environment. The vessel 204 may therefore be arranged in the outer container 280 in order to define an annular space 282 between the vessel 204 and the outer container 280. The annular space 282 may be held at a pressure $P_v$, which may be a vacuum pressure. In other cases, $P_v$ may be adapted based on the thermal requirements of the integral MSR 200. Additionally or alternatively, the annular space 282 may be configured to receive gas that may be adapted for emergency cooling of the vessel 204, among other uses.

Further, the drain tank section 220 is shown configured to hold the fuel salt in the subcritical volume 214, which may generally be defined collectively by the internal barrier 222, drain tank walls 226, and floors 228. With reference the internal barrier 222, the internal barrier 222 may be a structural component that establishes a physical barrier and physical separation between fuel salt held in the critical volume 210 and fuel salt held in the subcritical volume 214. In this regard, the internal barrier 222 may have a sufficient strength and rigidity in order to support a weight of the fuel salt within the critical region 208 without undue deformation or encroachment of the internal barrier 222 into or toward the subcritical volume 214.

The internal barrier 222 may be adapted to permit the passage of fuel salt between the critical volume 210 and the subcritical volume 214 only via the fuel salt passage 224 defined through the internal barrier 222. In order to permit the transfer of fuel salt between the critical volume 210 and the subcritical volume 214, the drain tank section 220 may further include a transfer pipe 230. The transfer pipe 230 may extend from the fuel salt passage 222 toward floors 228 of the drain tank section 220. As shown in FIG. 2, the floors 228 may be slopped to encourage fuel salt toward the transfer pipe 230. For example, an end of the transfer pipe 230 may have a mouth 232 that is disposed adjacent to the floors 228 of the drain tank section 220. In this regard, and as described in greater detail herein, fuel salt can be transferred from the subcritical volume 214 to the critical volume 210 until said fuel salt reaches an elevational level of the mouth 232 in the subcritical volume 214.

With further reference to the reactor section 240, the reactor section 240 may be configured to receive a volume of fuel salt from the drain tank section 220 and cause fission reactions that heat the fuel salt. For example, the reactor section 240 may generally include a reactor core 242 formed at least partially from a moderator material, such as a graphite material. The reactor core 242 may cause or otherwise facilitate the undergoing fission reactions in the critical region 208. Accordingly, the reactor core 242 may be constructed in a manner to receive the fuel salt and to cause the fuel salt to be heated therein. In this regard, the reactor core 242 is shown as having one or more fuel salt passages that extends generally from a core bottom side to a core top side. As described herein, the fuel salt may be encouraged to travel through the fuel salt passage, and in so doing, the fuel salt may be heated by fission reactions. In turn, the peripheral sides of the reactor core 242 may be arranged in order to define an annulus between the reactor core 242 and the vessel 204, through which the fuel salt may travel upon removal of heat from the fuel salt at the heat exchange section 260, and for subsequent recirculation into the core 242.

With further reference to the heat exchange section 260, the heat exchange section 260 may be configured to receive a flow of the heated fuel salt from the reactor section 240 and remove heat therefrom. For example, the heat exchange section 260 is shown as having a heat exchanger 262. The heat exchanger 262 may generally take of any of variety of forms in order to transfer heat from fuel salt of the critical volume 210 to a coolant salt or other medium that is held by the heat exchanger 262. Fuel salt (such as that which has been heated from one or more fission reactions) may be routed to the heat exchanger 262 and exposed to a cooler medium therein to remove heat from the fuel salt. In this regard, the coolant pipe run therein (including a cold leg 268a and a hot leg 268b shown in FIG. 2) may be in contact with the heated fuel salt that traverses through the heat exchanger 262 such that a coolant salt at an elevated temperature format (due to the transfer of heat from the fuel salt) may exit the heat exchanger 262 via the hot leg 268b.

The integral MSR 200 may further include a variety of other components to support the operation of the reactor. With continued reference to FIG. 2, the integral MSR 200 is shown as including a control rod 284. The control rod 284 may be a calibrated piece of metal that is selectively lowered and raised into the reactor 242 in order to reduce or stop a nuclear reaction occurring therein. As further shown in FIG. 2, the integral MSR 200 may include a fuel load line 286. The fuel load line 286 may be a pipe or conduit that is operable to carry a fuel salt from an environment exterior to the integral MSR 200 to the subcritical volume 214. For example, the fuel load line 286 may including a loading end 286a that is arranged outside of the outer container 280 and that is adaptable to receive a load of fuel salt therein. The fuel load line 286 may further include a dispending end 286b that is arranged within the subcritical volume 214. In this regard, the fuel salt received at the loading end 286a may be routed to through the fuel load line 286 and to the subcritical volume 214 for dispensing thereto via the loading end 286a.

As further shown in FIG. 2, the integral MSR 200 may include a pair of inert gas lines, including a subcritical gas line 287 and a critical region gas line 288. Each of the gas lines 287, 288 may be operable to control a pressure in the vessel 204. For example, the subcritical gas line 287 may have a loading end 287a that is arranged outside of the outer container 280 and operable to receive a flow of inert gas for routing to a dispensing end 287b that is arranged within the subcritical volume 214. Accordingly, a flow of inert gas can be controlled in order to control a pressure $P_{dt}$ of the subcritical volume 214, thereby controlling a pressure in the drain tank section 220. Further, the critical gas line 288 may have a loading end 288a that is arranged outside of the outer container 280 and operable to receive a flow of inert gas for routing to a dispensing end 288b that is arranged with the critical volume 210. Accordingly, a flow of inert gas can be controlled in order to control a pressure $P_{ht}$ of the heat exchange section 260 of the critical volume 210, and to control a pressure $P_r$ of the reactor section 240 of the critical volume 210. In other examples, other configurations and components of the integral MSR 200 are contemplated herein to accomplish the functionality of the various deployable nuclear reactors and deployable plants and microgrids described herein.

Figure 3:
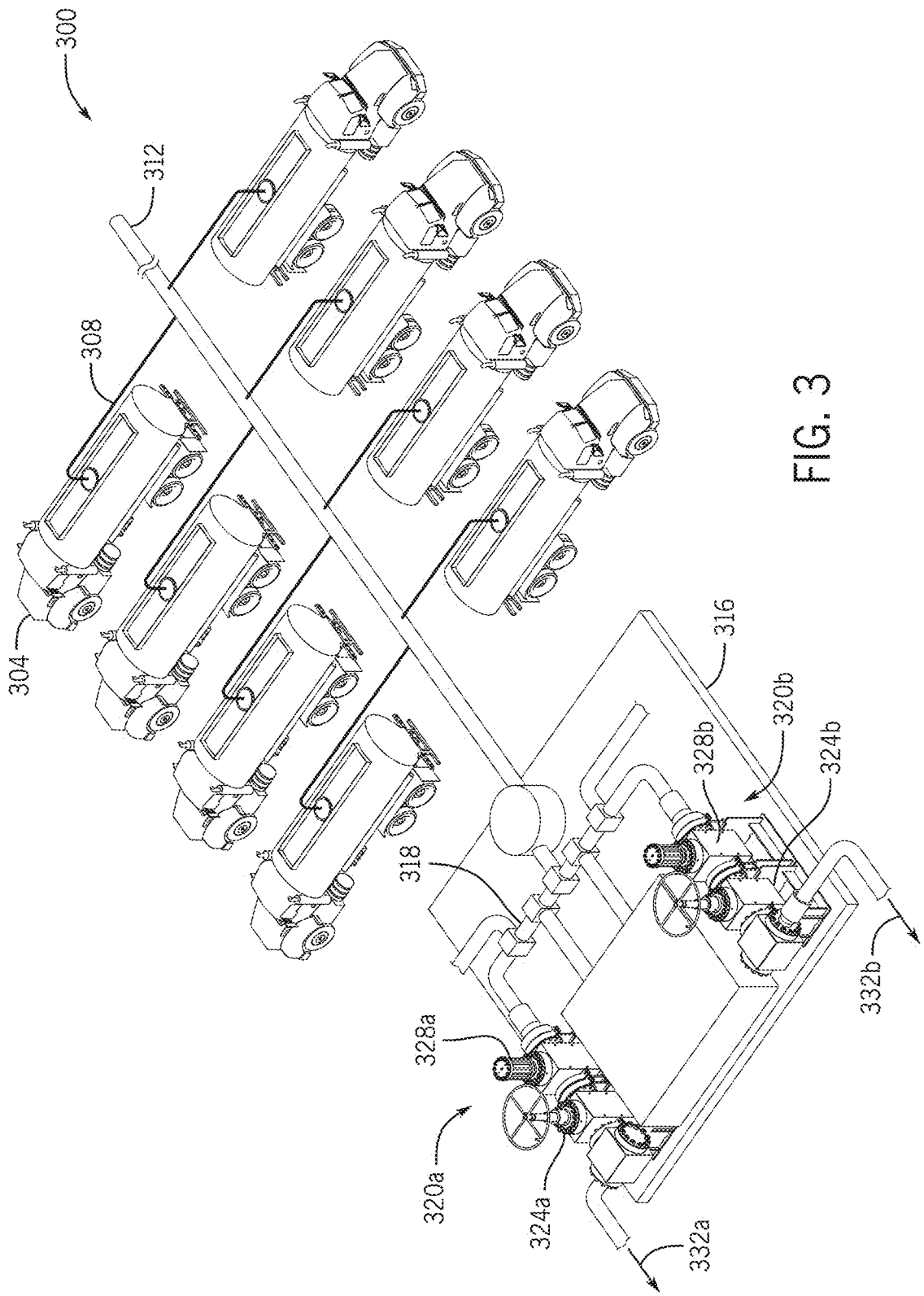
FIG. 3 depicts example equipment of a hydraulic fracturing operation.

With reference to FIG. 3, a system 300 is shown is shown illustrating example equipment used in hydraulic fracturing operations. As described herein, hydraulic fracturing operations may be one type, or one category, of operations associated with the hydrocarbon operations described herein that are integrated with or supported by the deployable nuclear reactors of the present disclosure. Broadly, hydraulic fracturing uses a pressurized fluid (often including a fracturing slurry composed of water, a proppant, and a chemical additive) that is injected into the subsurface reservoir—"production zone"—to increase a permeability of the reservoir, and thereby support the flow of hydrocarbons therein to the surface. At least some quantity of the pressurized, fracturing fluid may be recirculated to the surface upon injection into a hydrocarbon well (e.g., well 114). This recirculated fluid, which may include or be a produced water, may represent one waste stream associated with hydrocarbon operations. Using the systems and techniques described herein, for example with reference to FIGS. 4 and 5, the produced water or other recirculated form of the fracturing fluid may be treated, desalinated, and repurposed for other higher uses, including for municipal use.

In the example of the FIG. 3, the system 300 includes a bank of trucks 304 each fluidically coupled with a common line 312 via a pumping connection. The bank of trucks 304 may be illustrative of trucks uses to support a hydraulic fracturing operations, including trucks that operate to deliver fluids, pumps fluids, mix fluids, and/or control the deliver of fluids through the common line 312 and to the well head. Such fluids may include any one or more of a water, a proppant, a chemical additive and/or fluid that is used to form the hydraulic fracturing slurry. For purposes of illustration, FIG. 3 shows the common line 312 extending from the bank of trucks 304 to a skid 316 for delivery of the fracturing slurry to the well head. The skid 316 may include any appropriate collection of components may cooperate the control a delivery of the fracturing slurry to the well head. For example, the skid 316 may include a piping manifold that receives the fracturing slurry from the common line 312 and that routes the fracturing slurry to a first control system 320a and a second control system 320b. The first control system 320a may include a first control valve 324a, a first pressure regulating device 328a and/or any other appropriate equipment to facilitate the delivery of a fracturing slurry flow 332a to a first well head. Correspondingly, the second control system 320b may also include a second control valve 324b, a second pressure regulating device 328b and/or any other appropriate equipment to facilitate the delivery of a fracturing slurry flow 332b to a second well head.

Figure 4:
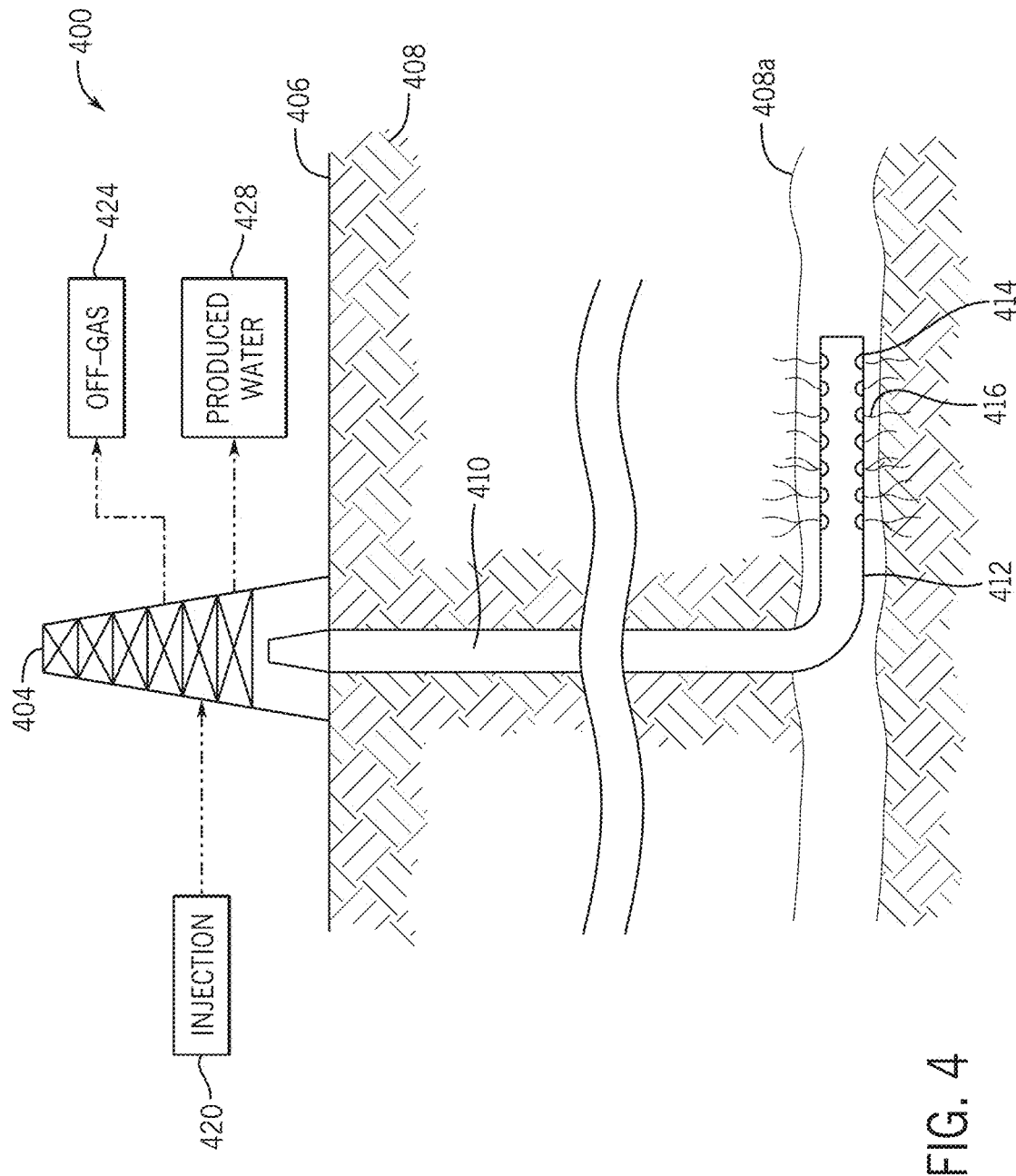
FIG. 4 depicts a cross-sectional view of a subsurface hydrocarbon well and associated functional systems.

With reference to FIG. 4, an example well site 400 is shown, schematically, which may be configured to receive the fracturing slurry flow from the system 300 described above. For example, the well site 400 may include a representative well 404. The well 404 may be any type of well configured to produce a hydrocarbons from a subsurface reservoir, including producing certain oil and gas hydrocarbons therefrom. The well site 400 is shown as having the well 404 arranged on ground 406 that sits about a subsurface 408. The subsurface 408 may include a plurality of subsurface geological formations, including a production zone or production formation 408a. The well 404 may including a well casing 410 that extends through the subsurface 408 and to the production formation 408a for extraction of hydrocarbons therefrom. For example, the well 404 may be an at least partially horizontally drilled well including a production casing section 412 that extends a horizontal distance into the production formation from the main portion of the largely vertical well casing 410. The production casing 414 may further including perforated holes 414 therethrough within the production formation 408a which may permit an injection flow 416 of hydraulic slurry to be emitted therethrough to impact the production zone 408a geology and increase its permeability to thereby induce a flow of hydrocarbons from the production zone 408a.

In connection with the foregoing operations, the well 400 is shown functionally associated with an injection module 420, an off-gas module 424, and a produced water module 428. The injection module 420 may include one or more processes and associated equipment that are configured to deliver a flow of fluid to the well 400 for a variety of purposes. In one example, the injection module 420 may include a hydraulic fracturing operation (such as that described above with reference to FIG. 3), and may therefore be adapted to deliver a stream of fracturing slurry to the well 404. Additionally or alternatively, the injection module 420 may be configured to deliver other fluid flows to the well 404, such as a stream flood, an acid wash, and/or other fluid that is adapted to enhance the recovery of the hydrocarbons from the production zone 408a, any one of which may be powered by or integrated with the various deployable nuclear reactor systems described herein. Further, the produced water module 428 may include one or more operations configured to receive and process fluid that is returned form the well 404. In some cases, such fluid may be a recirculated form of the injected fluid (e.g., a recirculated form of the fracturing fluid), particularly in a preproduction setting. In other cases, such fluid may be a water or other solution cut or separated from the oil or other hydrocarbons that are delivered by the well 404. For example, the produced oil may include a percentage of water, which is separated from the oil, and routed to a different process than the produced oil, via the produced water module 428. Further, the off-gas module 424 may include one or more operations configured to receive and process gases that are returned from the well 404. As one example, during production or otherwise, the well 404 may be prone to emit certain methane gases from the well casing 410. The off-gas module 424 receives such off-gases for treatment as a separate waste stream.

The deployable nuclear reactors described herein may be integrated with various hydrocarbon operations in a manner to treat waste streams from a well site, and to repurpose the waste stream into a higher use. For example, the deployable nuclear reactors may be integrated with the well 404 to treat and repurpose any produced water or other produced fluids from the produced water module 428. Further, the deployable nuclear reactors may be integrated with the well 404 to treat and repurpose and off-gasses from the off-gas module 424. However, the well 404 may be arranged in a generally remote location, such as being dozens or even hundred of miles from municipal services, which may hinder the ability to treat such waste streams.

Figure 5:
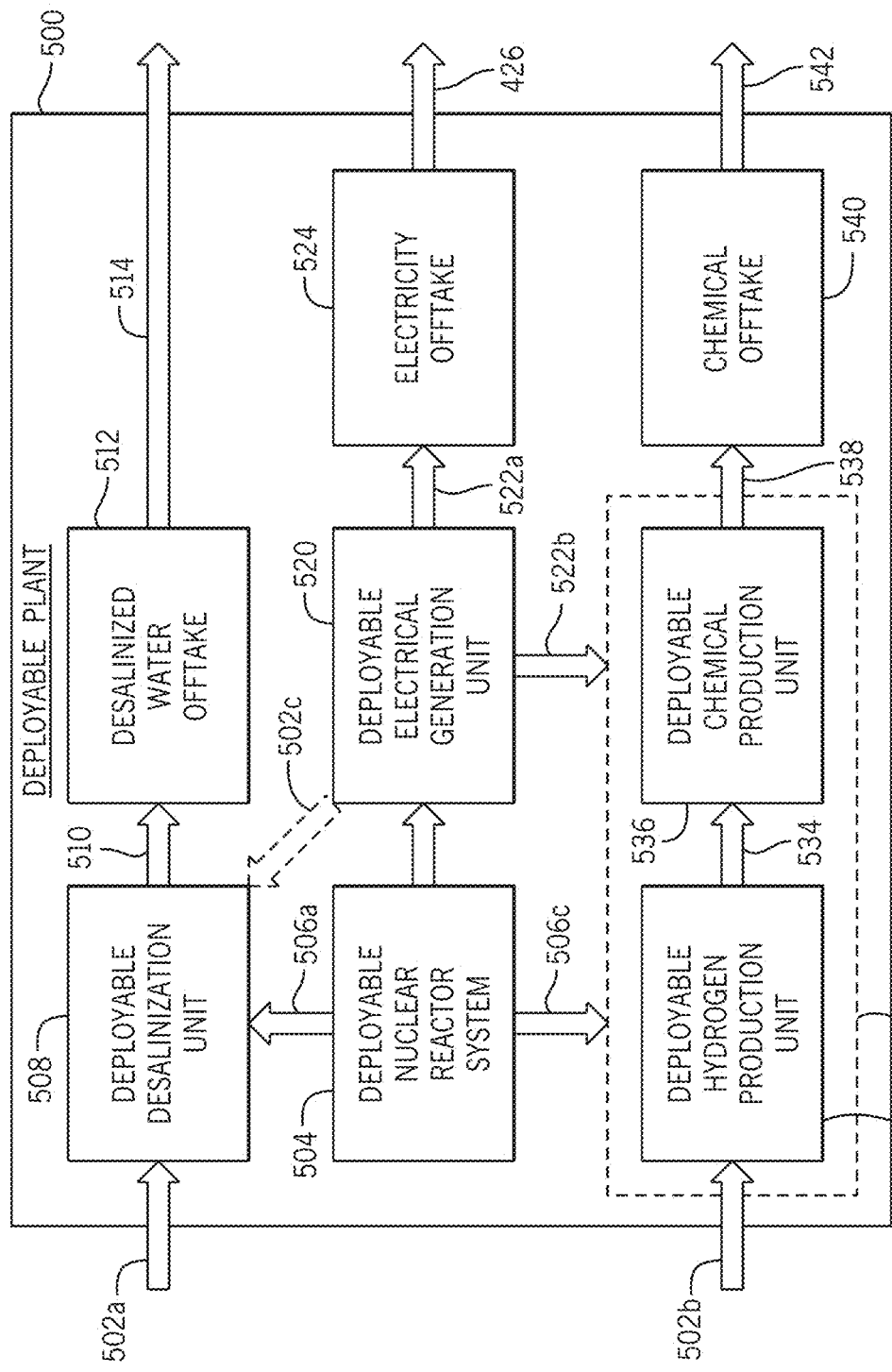
FIG. 5 depicts a functional diagram of a deployable plant including deployable nuclear reactor system.

To mitigate such concerns and to facilitate the treatment of the produced water, off-gas and/or other waste stream, FIG. 5 depicts a deployable plant 500 of the present disclosure. The deployable plant 500 may include any appropriate modules, components, systems, and subassemblies to treat and/or repurpose one or more waste streams of hydrocarbon operations using a deployable nuclear reactor. The deployable plant 500 may be substantially mobile and modular in construction. While the deployable plant 500 is shown, functionally, in FIG. 5 as one cohesive unit, in operation, the deployable plant 500 may include numerous trucks (e.g., semi tractor-trailers), skids, mobile connections, and so on such that the deployable plant 500 may be deployed, on demand to generally remote location associated with the hydrocarbon well. Further, while various modules and units of the deployable plant 500 are described herein, it will be appreciated that each such module and unit may, in turn, also be composed of numerous such trucks, skids, and mobile connections in support of the overall operation of the deployable plant 500.

The deployable plant 500 includes a deployable nuclear reactor system 504. The deployable nuclear reactor system 504 may be or include any of the nuclear reactor systems described herein, such as the integral MSR described in relation to FIG. 2. In this regard, while the deployable nuclear reactor system 504 may be a molten salt nuclear reactor, other reactor types are possible, including, without limitation super critical water reactors, liquid sodium cooled reactors, helium or other gas cooled reactors, liquid metal cooled reactors, certain pressurized water reactors, among others. The deployable nuclear reactor system 500, as with all of the units of the deployable plant 500, may be a mobile unit that is configured to be transported to a first site, operated for a period of time, and moved to a second site for subsequent operation. Accordingly, the deployable nuclear reactor system 504 may be arranged to fit entirely on one or more tractor-trailers for transport using existing highway infrastructure. The deployable nuclear reactor system 504 may operate to produce heat, such as with the range of 600-750° C. At least some of this heat from the deployable nuclear reactor system 504 may be used by other units of the deployable plant 500 via heat outputs 506a, 506b, 506c.

With further reference to FIG. 5, the deployable plant 500 includes a deployable electrical generation unit 520. The deployable electrical generation unit 520 may include any type of mobile unit that is configured to transform a heat into electricity, and may include one or more certain Rankine cycle generators, Stirling engines, thermoelectric generators, and/or other mechanisms that produce electricity from heat, including Brayton cycle generators and supercritical $CO_2$ generators, among others. Accordingly, and as shown in FIG. 5, the deployable electrical generation unit 520 may receive the heat output 506b and, in turn produce one or more electrical outputs 522a, 522b, 522c. Electrical outputs 522b, 522c may be used to supply electricity to other deployable units of the deployable plant 500, as described in greater detail below. Electrical output 522a may be used to supply electricity to components and systems other than the deployable plant 500, such as systems of the hydrocarbon operations that require electrical power, and/or to a power grid. In this regard, the deployable plant 500 is shown in FIG. 5 as including an electricity offtake module 524. The electricity offtake module 524 may include any appropriate components configured to cooperate to take the electrical output 522a and form an electrical power off-take output 526, including certain breakers, switches, gears, routers, and the like. The electrical power off-take output 526 may then be used to directly supply electrical power to the hydrocarbon operations (e.g., such as the pumps 138 shown in relation to FIG. 1) and/or to a grid or other commercial industrial use, as described in greater detail herein with reference to FIG. 8.

With continued reference to FIG. 5, the deployable plant 500 is shown as including a deployable desalination unit 508. The desalination unit 508 may generally include any appropriate collection of components that is configured to treat and process any waste fluids from the various hydrocarbon operations described herein, such as those described in FIG. 4 associated with the produced water module 428. By way of example, the deployable desalination module 508 shown in FIG. 5 is configured to receive a produced water input 502a, such as a produced fluid or waste stream from any manner of hydrocarbon operation. The deployable desalination module 508 may operate to substantially reduce or eliminate a salt content of the produced water input 502a. In some cases, the deployable desalination unit 508 may operate to filter, purify, or otherwise treat the produced water input 502a such that produced water input 502a may be treated to at least the minimum acceptable standards for introduction into an municipal water treatment facility. The deployable desalination unit 508 may therefore produce a desalinated water output 510 that is routed to a desalinated water offtake 512. The desalinated water offtake 512 may include any of a variety of components to facilitate the transfer of the desalinated water to another facility or use, including housing certain water pumps, tanks, ports, hoses, and so on. At least one water flow 514 may proceed from the desalinated water offtake 512. In some cases, the water flow 514 may be a series of piping that leads the desalinated water to a municipal water source (as described herein in relation to FIG. 8). In other cases, the water flow may additionally or alternatively represent a flow of water via trucks or other equipment from the deployable plant 500, for example, where the water is moved off of the deployable plant 500 via truck.

In order to facilitate the foregoing operation, the deployable desalination unit 508 may use the heat output 506a from the deployable nuclear reactor system 504. For example, the deployable desalination unit 508 may require receiving the heat output 506a in the range of around 30 to 40 MWth, although other levels of thermal energy may be utilized Additionally or alternatively, the deployable desalination unit 508 may use the electrical output 522c from the deployable electric generation unit 520 in support of the production of the desalinated water output 510.

With continued reference to FIG. 5, the deployable plant 500 is further shown as including a deployable hydrogen production unit 532 and a deployable chemical production unit 536. The deployable hydrogen production unit 532 and the deployable chemical production unit 536 may collectively define a deployable gas processing system 530. The deployable hydrogen production unit 532 may generally include any appropriate collection of components that are configured to treat and process any waste gases from the various hydrocarbon operations described herein, such as those described in FIG. 4 associated with the off-gas module 424. For example, the deployable hydrogen production unit 532 may include a steam-methane reformer that uses a steam input and a methane input to produce hydrogen. Additionally or alternatively, water electrolysis or other technique may be used to produce hydrogen. By way of example, the deployable hydrogen production unit 532 shown in FIG. 5 is configured to receive an off-gas input 502b, such as an off-gas or other gas waste stream from any manner of hydrocarbon operation. In one example, the deployable hydrogen production unit 532 may operate to transform a casing gas (e.g., a methane case, $CH_4$) into hydrogen ($H_2$) output 534 via a steam methane refining processes. In other cases, other processes and techniques may be used to produce hydrogen from the casing gas. The deployable hydrogen production module 532 may use the heat output 506c from the deployable nuclear reactor system 504 to produce the hydrogen output 534. For example, the deployable hydrogen production unit 532 may require receiving the heat output 506c in the range of around 5 to 1 MWth, based on a volume of casing processed thereby. Additionally or alternatively, the deployable hydrogen production unit 532 may use the electrical output 522b from the deployable electric generation unit 520 in support of the production of the hydrogen output 534.

As further depicted in FIG. 5, the deployable gas processing system 530 includes the deployable chemical production unit 536. The deployable chemical production unit 536 may generally include any appropriate collection of components that are configured to produce one or more chemicals from a hydrogen gas feedstock supplied by the hydrogen output 534. In one example, the deployable chemical production unit 536 may operate to transfer the hydrogen output 534 into an ammonia ($NH_3$) or chemical product 538 via a Haber-Bosch process. In other cases, other processes and techniques may be used to produce an ammonia product and/or other chemical product for commercial or industrial uses. The deployable chemical production unit 536 may use the heat output 506c from the deployable nuclear reactor system 504 to produce the chemical product 538. For example, the deployable chemical production unit 536 may require receiving the heat output 506c in the range of around 5 to 50 MWth based on a volume of the hydrogen processed thereby. Additionally or alternatively, the deployable chemical production unit 536 may use the electrical output 522b from the deployable electrical generation unit 520 in support of the production of the chemical product 538.

The deployable plant 500 may further include a chemical offtake 540. The chemical offtake 540 may include any appropriate components and systems to prepare the chemical product 538 for delivery to and offtake to an end customer. For example, the chemical offtake 540 may include certain tanks, vessels, piping, pumps, and so on that facilitate the transfer of the chemical product 538 off of the deployable plant 500 via the chemical flow 542. For the purposes of illustration, the chemical product 538 may be removed from the deployable plant 500 via a series of trucks that receive the chemical product 538 from holding tanks of the chemical offtake 540. In this regard, the chemical flow 542 may represent the output of the chemical product via said trucks. Whereas, in other cases, the chemical flow 542 may be indicative of other outputs of the chemical product 538, including via a direct piping connecting to another processing or holding facility external to the deployable plant 500.

The deployable plant 500 of FIG. 5 may used with a wide variety of well sites in remote locations to establish a micro-grid. For example, often hydrocarbon wells are drilled in clusters in a remote location due the presence of a concreted subsurface hydrocarbon reservoir there below. The deployable plants of the present disclosure may be deployed in the field to a remote location and proximal to or otherwise close to such clusters of hydrocarbon wells. In this manner, the deployable plants may be used to produce electrical power for, and to treat or repurpose waste streams for, multiple hydrocarbon wells, all in the geographic well cluster.

Figure 6:
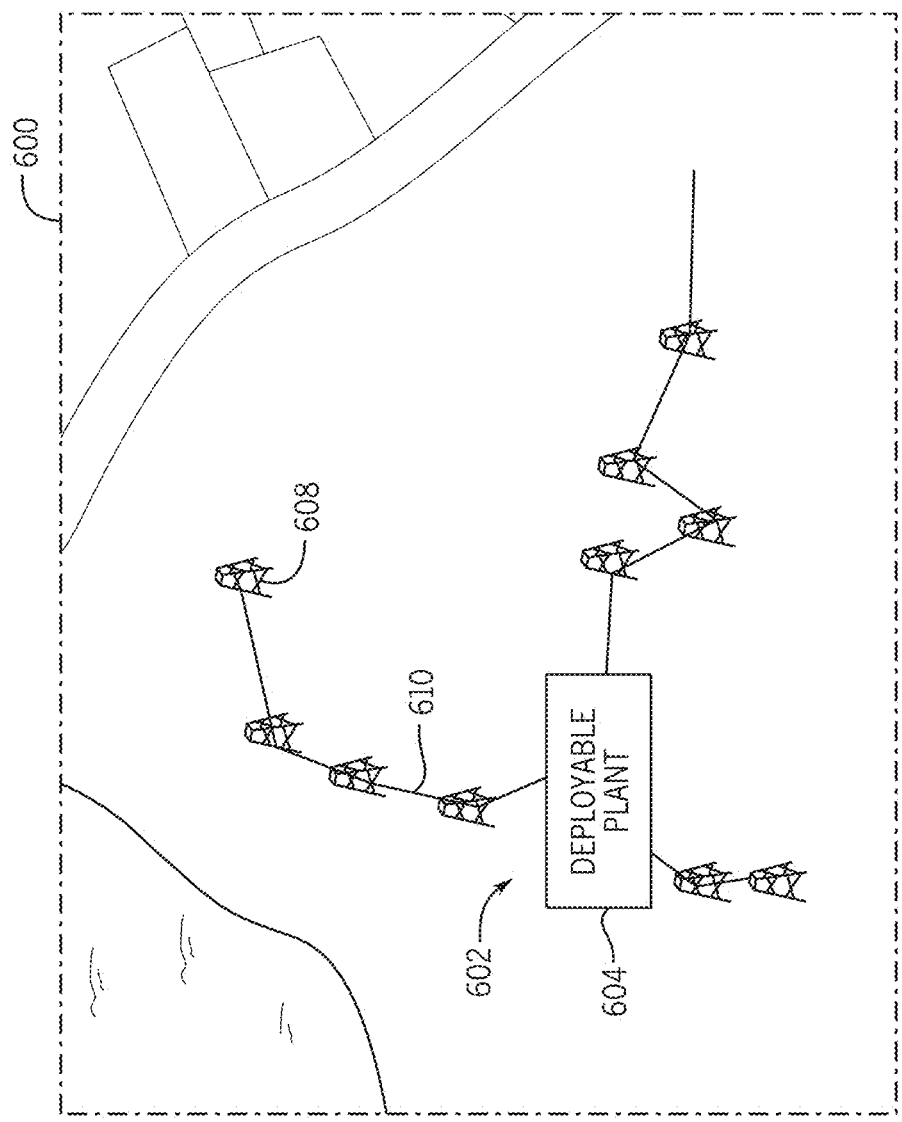
FIG. 6 depicts an example micro-grid including the deployable plant of FIG. 5.

For example, and with reference to FIG. 6, a remote region 600 is depicted including a plurality of well sites 608 which may be a first cluster of hydrocarbon wells. A deployable plant 604 may be provided proximal to the well sites 608. The deployable plant 604 may be substantially analogous to the deployable plant 500 of FIG. 5 and include any of the modules described herein. In this regard, the deployable plant 604 may be configured to supply electrical power to any hydrocarbon operations that occur on any of the well site 608. Further, the deployable plant 604 may be configured to receive a flow of produced or wastewater from any of the well sites 608 for treating and reprocessing as described herein. Further, the deployable plant 604 may be configured to receive a flow of casing or off-gas from any of the well sites 608 for treating and reproposing as described herein. Accordingly, the deployable plant 604 may be operable to establish a microgrid 602 with the well sites 608 in which the deployable plant 604 may receive and/or transmit fluids, gases, and electricity therebetween along operative connections 610. By arranging the deployable plant 604 proximal to the cluster of well sites 608, the benefits of integrating the deployable nuclear reactor may be realized across multiple different hydrocarbon wells. And as additional wells are drilling in this cluster, the operative connections 610 can be extended to expand the micro-grid 602 as needed. In some cases, the operative connections 610 can be extended to abandoned wells in order to provide heat and/or thermal requirements to operations associated with mitigating and closing said abandoned wells.

Figure 7:
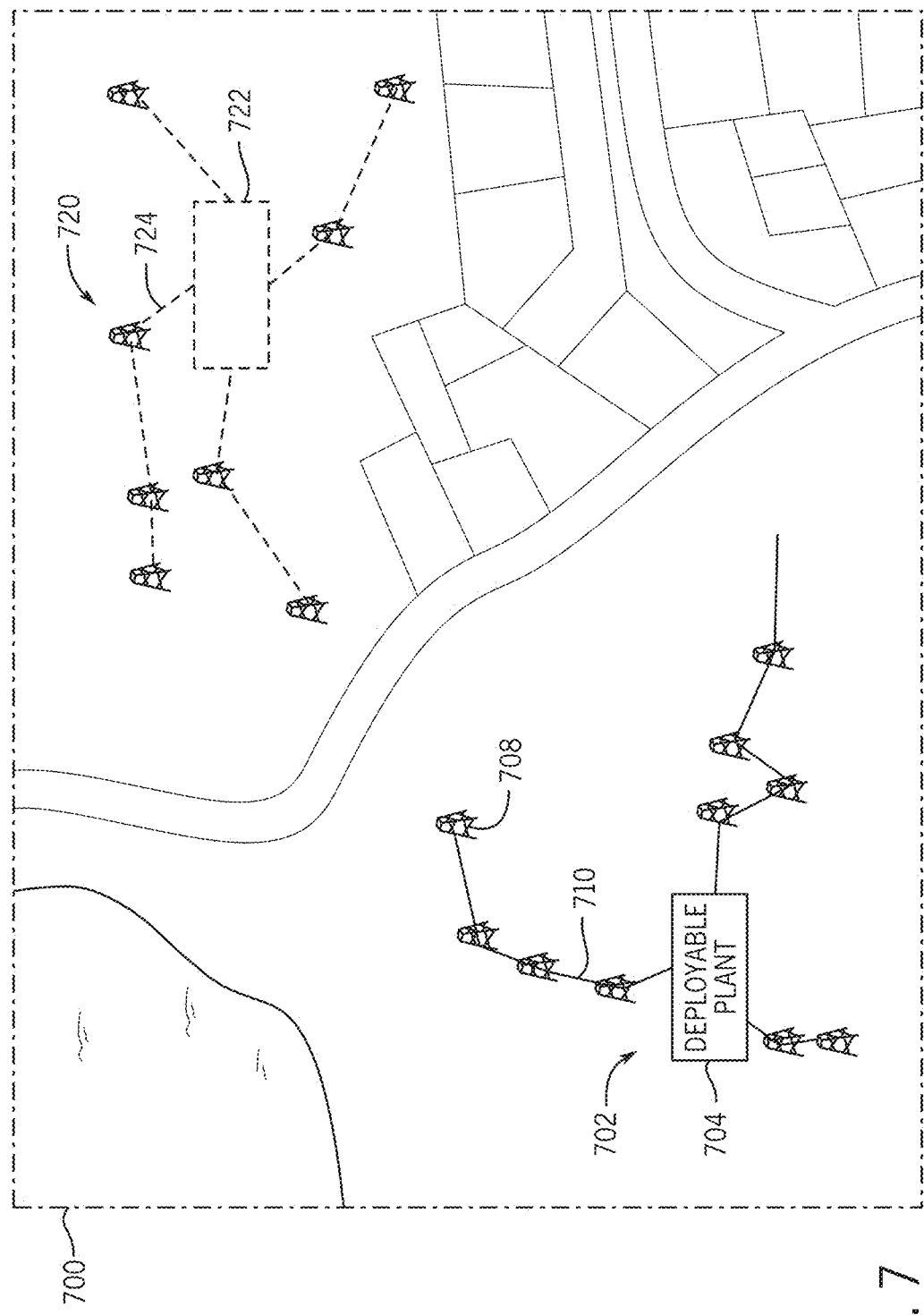
FIG. 7 depicts the example micro-grid of FIG. 6 at a first geographic location, and a cluster of well sites at a second geographic location.

The deployable plants of the present disclosure may be movable, as needed, to subsequent clusters of wells. For example, and as shown in FIG. 7, a region 700 is depicted including a micro grid 702. The microgrid 702 may be substantially analogous as the microgrid 602 and include a deployable plant 704, a plurality of well sites 708, and operative connections 710; redundant explanation of which is omitted herein for clarity. FIG. 7 further illustrates, a second cluster of wells 720 at a second geographic location different from the first geographic location of the wells 708. The second cluster of wells 720 may be sufficiently far from the deployable plant 704 that it would be inefficient to merely extend the operative connections 710 to the additional wells. Rather, the deployable unit 704 (or any other deployable unit described herein) may be moved to the deployable plant site 722 which may support establishing operative connections 724 between said deployable plant and the wells of the second cluster of wells 720.

Figure 8:
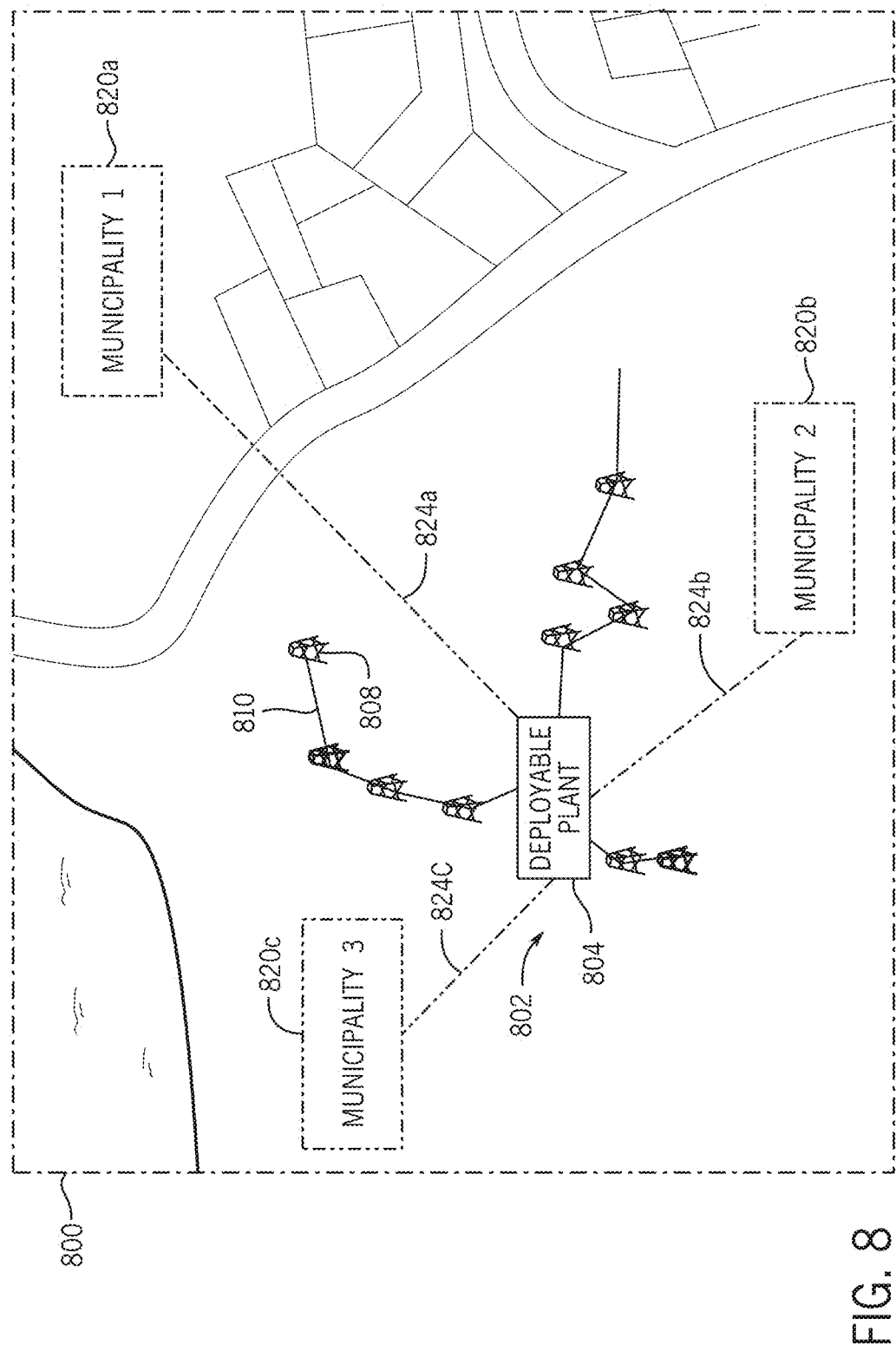
FIG. 8 depicts the example micro-grid of FIG. 6 and adjacent municipalities.

In some cases, the deployable plants of the present disclosure may be adapted to provide outputs to neighboring municipalities. For example, the deployable plants may be configured to desalinate, filter, purify and/or otherwise treat produced water from one or more hydrocarbon wells to a standard that permits the treated produced water to enter a municipal drinking water system. For example, and as shown in FIG. 8, a region 800 is depicted including a microgrid 802. The micro grid 802 may be substantially analogous to the microgrids 602 and 702 and include a deployable plant 804, a plurality of wells sites 808, and operative connections 810; redundant explanation of which is omitted herein for clarity. Further FIG. 8 further illustrates neighboring municipalities 820a, 820b, 820c. In one example, the deployable plant 804 of the micro grid 802 may be operable to transfer a treated produced water output to one or more of the municipality 820a via a fluid connection 824a, the municipality 820b via a fluid connection 824b, or the municipality 820c via a fluid connection 824c. The fluid connections 824a, 824b, 824c may be a flexible, synthetic or rolled piping that can be readily installed and removed and reassembled at a second location in order to move with and be adaptable to the position of the deployable plant 804.

Figure 9:
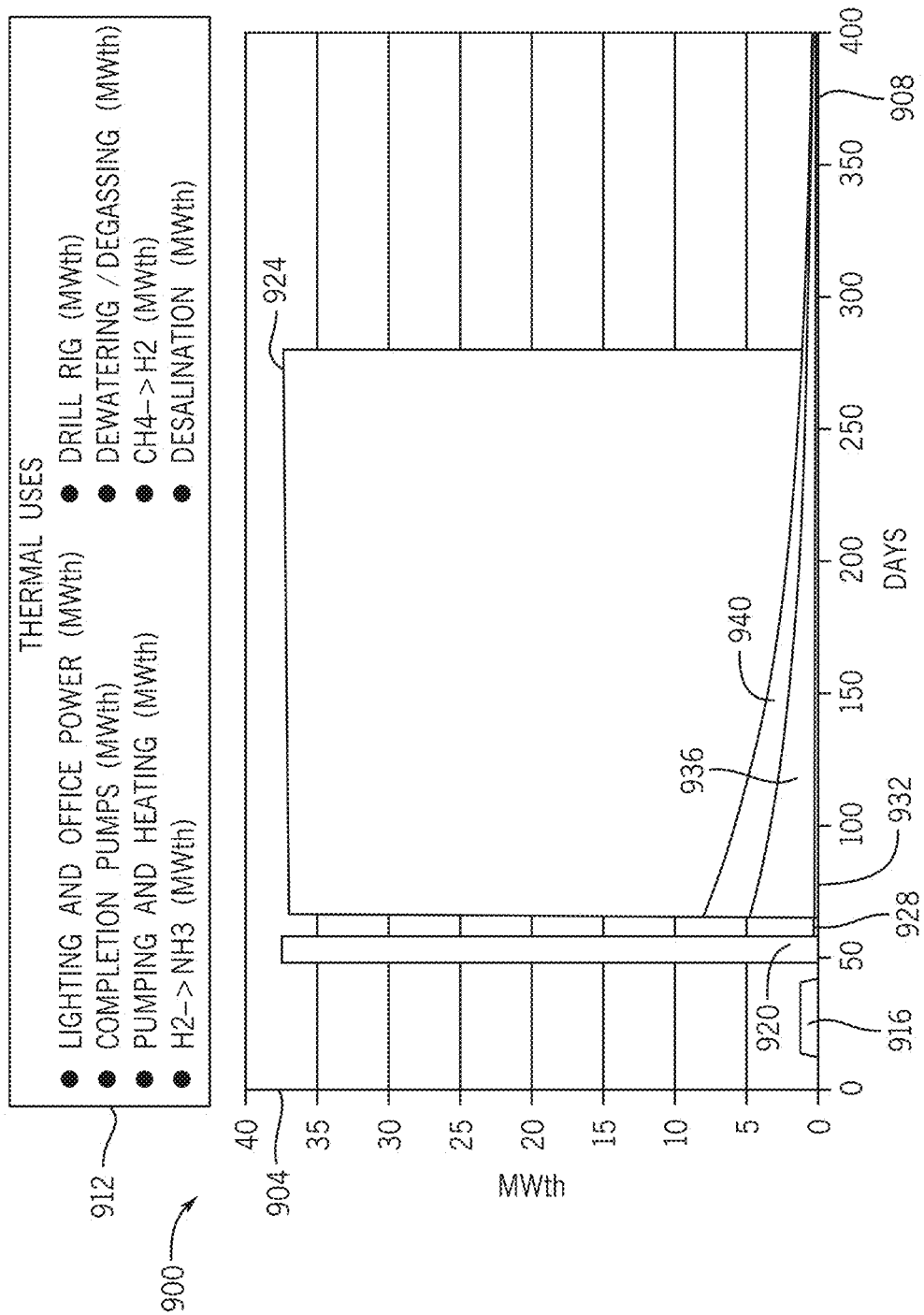
FIG. 9 depicts a chart illustrating example thermal requirements of a system including hydrocarbon extraction and nuclear reactor operations.

FIGS. 9-12 depicts various example energy and material balance requirements of the hydrocarbon operations and associated deployable nuclear reactor systems described herein. With reference to FIG. 9, a chart 900 is shown illustrating example thermal requirements of certain hydrocarbon operations and associated deployable nuclear reactor systems, such as those described above in relation to FIGS. 1-8. The chart 900 includes a thermal requirements axis 904 (MWth), values for which are plotted along a time axis 908 delineated in days. The time axis 908 may represent a time period that commences with onsite activities for drilling a hydrocarbon well, and proceeds through various stages of the well including hydraulic fracturing, completions, and production. The chart 900 includes data for various hydrocarbon operations, such as those listed the legend 912. Operations that require electrical energy input have thermal energy requirements equal to the electrical energy requirements divided by the thermal efficiency of the electrical generating system used. By way of example, the chart 900 shows thermal requirements 916, which may be the thermal requirements associated with the "Drill Rig." The chart 900 further shows thermal requirements 920, which may be the thermal requirements associated with the "Completion Pumps." The chart 900 further shows thermal requirements 924, which may be the thermal requirements associated with the "Desalination" operations. The chart 900 further shows thermal requirements 928, which may the thermal requirements associated with the "Dewatering/Degassing" operations. The chart 900 further shows thermal requirements 932, which may be the thermal requirements associated with the "Pumping Heating" operations. The chart 900 further shows thermal requirements 936, which may be the thermal requirements associated with the operations for converting a casing gas to hydrogen, i.e., "CH4→H2," operations. The chart 900 further shows thermal requirements 940, which may be the thermal requirements associated with the operations for converting a hydrogen gas to ammonia, i.e., "H2→NH3," operations. In some cases, the deployable nuclear reactor may also supply thermal energy to the "Lighting and Office Power," which is not depicted on chart 900 due to the requirements for "Lighting and Office Power" being substantially lower than the other requirements shown in chart 900.

Figure 10:
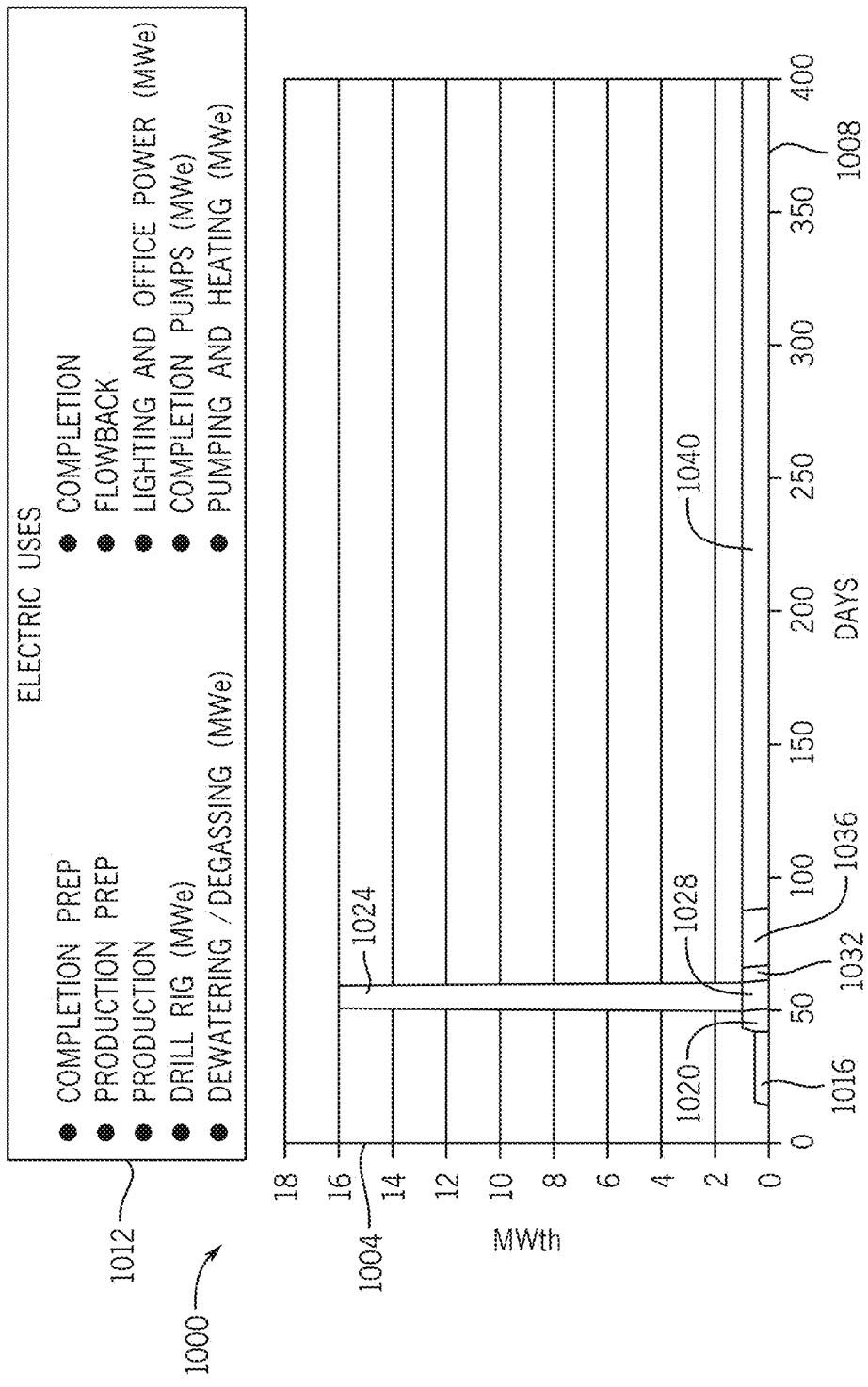
FIG. 10 depicts a chart illustrating example electric requirements of the system of FIG. 9.

With reference to FIG. 10, a chart 1000 is shown illustrating example electrical requirements of certain hydrocarbon operations and associated deployable nuclear reactor systems, such as those described above in relation to FIGS. 1-8. The chart 1000 includes an electrical requirements axis 1004 (MWe), values for which are plotted along a time axis 1008. The time axis 1008 may represent a time period that commences with onsite activities for drilling a hydrocarbon well, and proceeds through various stages of the well including hydraulic fracturing, completions, and production. The chart 1000 includes data for various hydrocarbon operations, such as those listed the legend 1012. By way of example, the chart 1000 shows electrical requirements 1016, which may be the electrical requirements associated with the "Drill Rig." The chart 1000 further shows electrical requirements 1020, which may be the electrical requirements associated with the "Completion Prep" operations. The chart 1000 further shows electrical requirements 1024, which may be the electrical requirements associated with the "Completion Pumps" operations. The chart 1000 further shows electrical requirements 1028, which may the electrical requirements associated with the "Completion" operations. The chart 1000 further shows electrical requirements 1032, which may be the electrical requirements associated with the "Production Prep" operations. The chart 1000 further shows electrical requirements 1036, which may be the electrical requirements associated with the "Flowback" operations. The chart 1000 further shows electrical requirements 1040, which may be the electrical requirements associated with the "Production" operations. In some cases, the deployable nuclear reactor may also supply electrical energy to the "Dewatering/Degassing," "Lighting and Office Power," and/or "Pumping and Heating" operations, each of which are not depicted on chart 1000 due to the electrical requirements of such generally being substantially lower than the other requirements shown in chart 1000.

Figure 11:
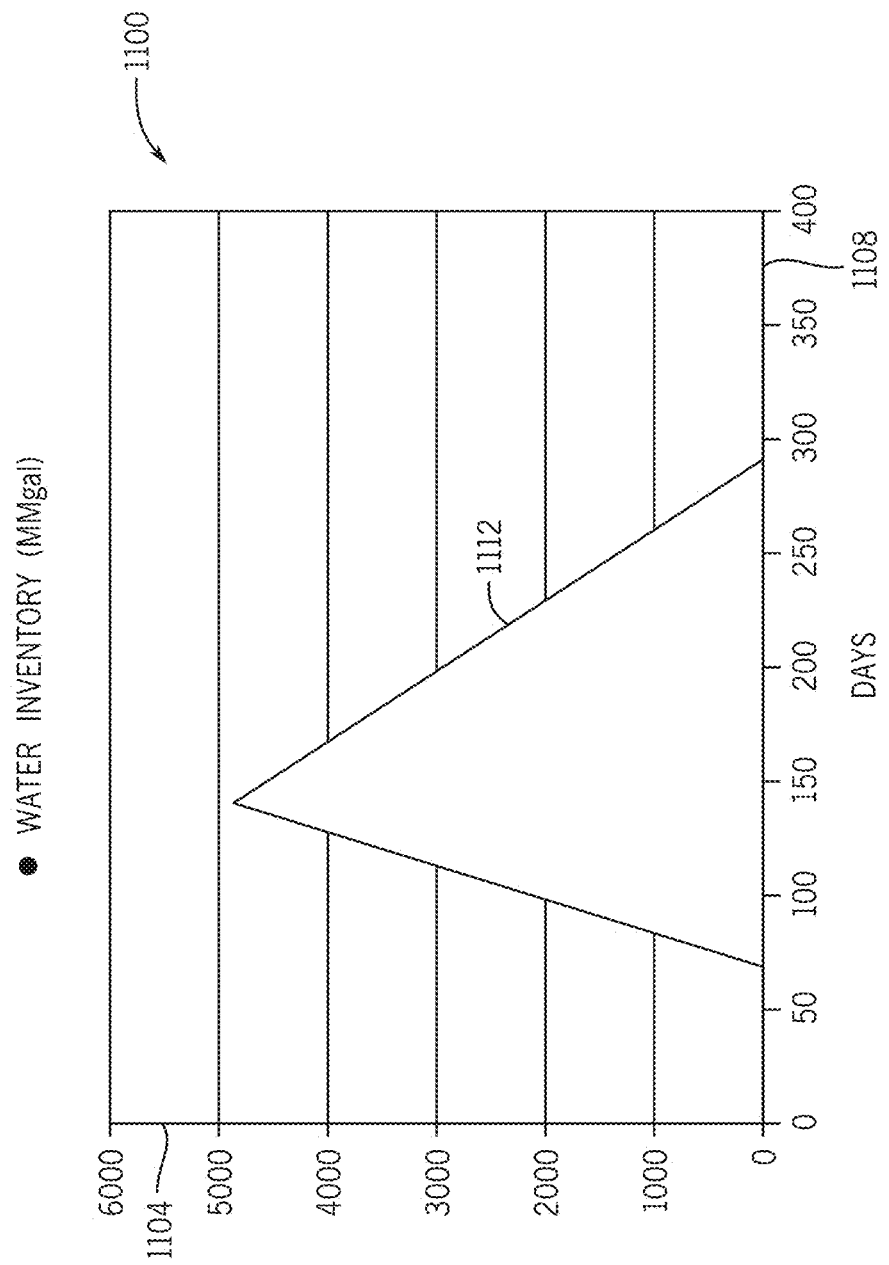
FIG. 11 depicts a chart illustrating example produced water volume associated with the system of FIG. 9.

With reference to FIG. 11, a chart 1100 is depicted illustrating an example produced water volume inventory associated the system of FIG. 9, or any generally with any of the hydrocarbon operations described herein. The chart 1100 includes a volume axis 1104, values for which are plotted along a time axis 1108. The time axis 1108 may represent a time period that commences with onsite activities for drilling a hydrocarbon well, and proceeds through various stages of the well including hydraulic fracturing, completions, and production. The chart 1100 further includes a curve 1112 that shows the volume of produced water inventory that may be expected during such hydrocarbon operations along the time axis 1108, as measured in millions of gallons of water. As shown in FIG. 11, after an initial period, the curve 112 reflects a decrease in water inventory over time as said water removed from the pond or other capture facility and is desalinated and treated for other uses.

Figure 12:
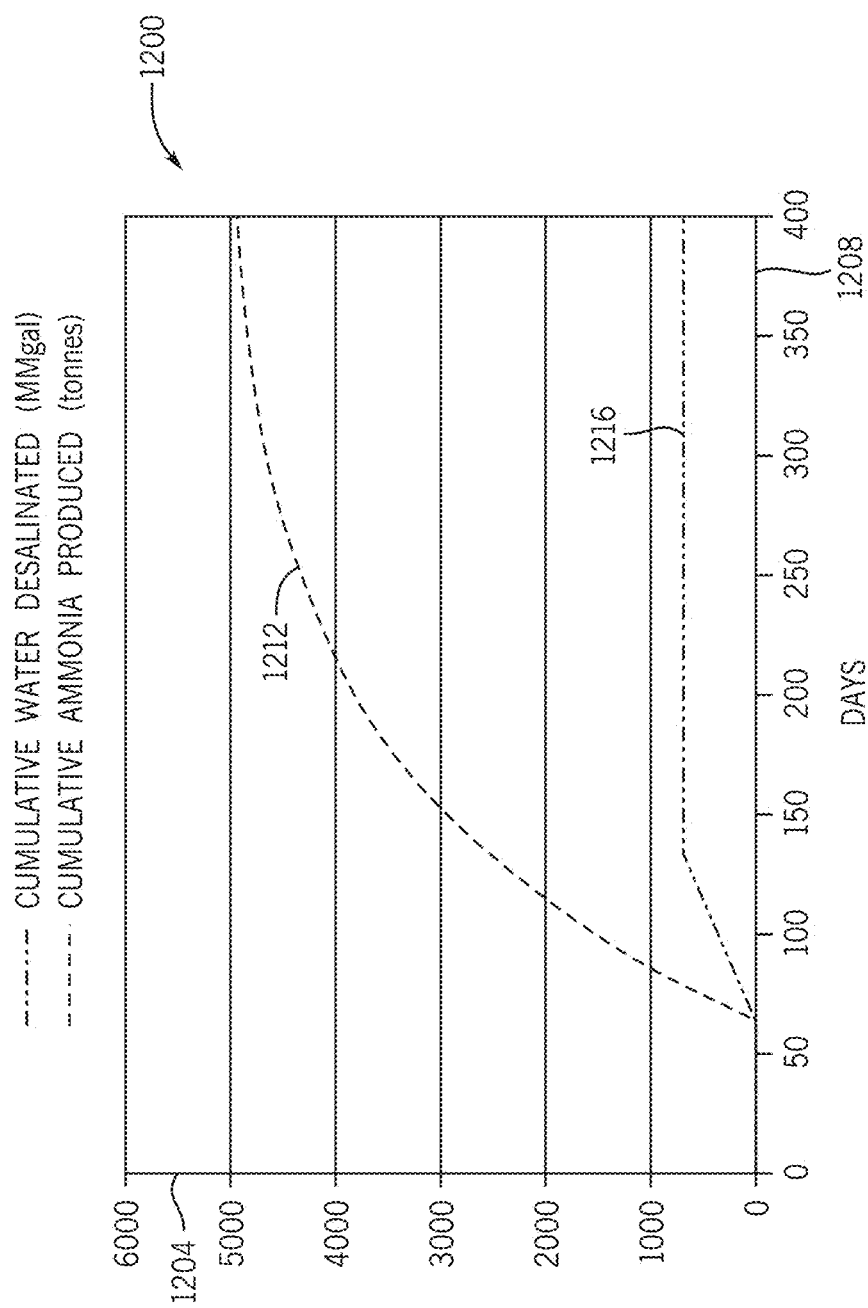
FIG. 12 depicts a chart illustrating example cumulative desalinated water and cumulative ammonia produced using the system of FIG. 9.

With reference to FIG. 12, a chart 1200 is depicted illustrating an example cumulative desalinated water produced and a cumulative ammonia produced associated with the system of FIG. 9, or any generally with any of the hydrocarbon operations described herein. The chart 1200 includes a volume axis 1204, values for which are plotted along a time axis 1208. The time axis 1208 may represent a time period that commences with onsite activities for drilling a hydrocarbon well, and proceeds through various stages of the well including hydraulic fracturing, completions, and production. The chart 1200 further includes a curve 1212 that shows the cumulative volume of desalinated water produced during such hydrocarbon operations along the time axis 1208, as measured in millions of gallons of desalinated water. The chart 1200 further includes a curve 1216 that shows the cumulative volume of ammonia produced during such hydrocarbon operations along the time axis 1208, as measured in tonnes of ammonia produced.

Figure 13:
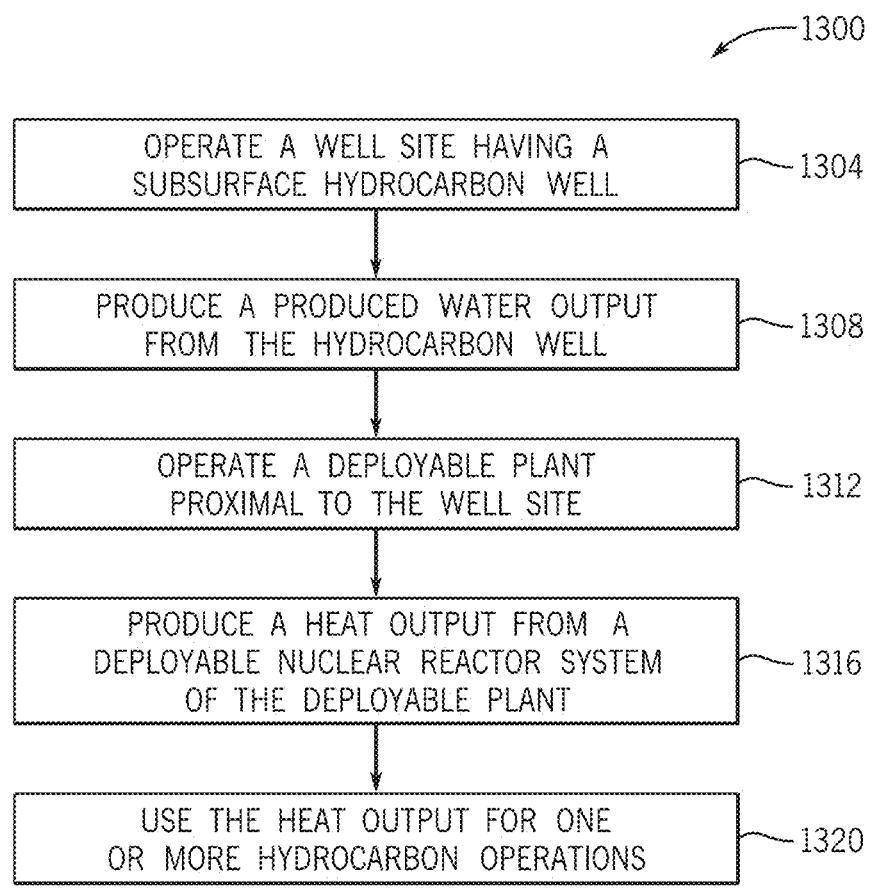
FIG. 13 depicts a flow diagram of a method of treating an output of a well site using nuclear reactors.

FIG. 13 depicts a flow diagram of a method 1300 of treating an output of a well site using nuclear reactors. At operation 1304, a well site having a subsurface hydrocarbon well is operated. For example, and with reference to FIG. 4, the well site 400 is operated, such as operating the representative hydrocarbon well 404. Operating the well 404 may include performing any number of hydrocarbon operations, described herein, including operations associated with drilling, completions, hydraulic fracturing, or production. At operation 1308, a produced water output is produced from the hydrocarbon well. For example, and with continued reference to FIG. 4, the hydrocarbon operations performed on the well 404 may generate the produced water output 428. In some cases, the produced water output may include a recirculated form of a pressurized fluid that is injected into the well 404, such as a fracturing fluid.

At operation 1312, a deployable plant is operated proximal to the well site. For example, and with reference to FIGS. 4 and 5, the deployable plant 500 is operated proximal the well site 400. In this regard, the deployable plant 500 may operate to receive and treat one or more outputs from the well 404, including the produced water output 428 and/or the off-gas output 424. Further, and as shown at operation 1316, a heat output is produced from a deployable nuclear reactor system of the deployable plant. For example, and with continued reference to FIGS. 4 and 5, the deployable plant 500 may operate the deployable nuclear reactor system 504, as described herein. The heat generated from the deployable nuclear reactor system 504 may be used to support the processing and treatment of the produced water output and/or the off-gas output. In this regard, and as shown at operation 1320, the heat output is used for one or more hydrocarbon operations. For example, and with continued reference to FIGS. 4 and 5, the deployable nuclear reactor system 504 may supply the heat output 506a to the deployable desalination unit 508 to support the processing and treatment of the produced water into the desalinated water, as described herein. In other examples, the method 1300 may continue with the deployable electric generation unit 520 producing an electrical output, and/or with the deployable gas processing system 530 producing a chemical product, as described herein in relation to FIG. 5.

Other examples and implementations are within the scope and spirit of the disclosure and appended claims. For example, features implementing functions may also be physically located at various positions, including being distributed such that portions of functions are implemented at different physical locations. The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A system comprising
a well site comprising a subsurface hydrocarbon well configured to produce an off-gas output;
a deployable nuclear reactor system configured to produce a heat output; and
a deployable off-gas processing system configured to produce an industrial chemical using the off-gas output of the subsurface hydrocarbon well and the heat output of the deployable nuclear reactor or an electrical output derived therefrom;
wherein the deployable off-gas processing system comprises a deployable hydrogen production unit configured to produce a hydrogen output using the off-gas output of the subsurface hydrocarbon well and the heat output of the deployable nuclear reactor or an electrical output derived therefrom;
wherein the deployable off-gas processing system comprises a deployable chemical production unit configured to produce the industrial chemical using the hydrogen output of the hydrogen production module and the heat output of the deployable nuclear reactor or an electrical output derived therefrom; and
wherein the deployable chemical production unit comprises a Haber-Bosch processing unit.

2. The system of claim 1, wherein the deployable hydrogen production unit comprises a steam methane refining process.

3. The system of claim 1, wherein the industrial chemical comprises ammonia.

4. The system of claim 1, wherein the system further comprises a deployable electrical generation unit configured to produce an electrical power output using the heat output from the deployable nuclear reactor.

5. The system of claim 4, wherein the well site comprises one or more hydraulic fracturing systems, drilling systems, completion systems, or productions systems that are powered by the electrical power output of the deployable electrical generation unit.

6. A micro-grid comprising
a plurality of well sites clustered in a first geographic location, each well site of the plurality of well sites includes a subsurface hydrocarbon well configured to produce an off-gas output;
a deployable plant deployed proximal the first geographic location and comprising a deployable nuclear reactor system configured to produce a heat output; and
a network of pipes configured to deliver the off-gas output from each well site of the plurality of well sites to the deployable plant,
wherein the deployable plant is configured to produce an industrial chemical output using the off-gas output and the heat output from the nuclear reactor system or an electrical output derived therefrom;

wherein the plant further comprises
 a deployable hydrogen production unit configured to perform steam methane refining, and
 a deployable chemical production unit configured to perform a Haber-Bosch process.

7. The micro-grid of claim 6, wherein the deployable plant further comprises a deployable electrical generation unit configured to produce an electrical power output using the heat output from the deployable nuclear reactor.

8. The micro-grid of claim 7, wherein the micro-grid further comprises a network of power lines configured to deliver the electrical power output to each well site of the plurality of well sites and power at said well site one or more hydraulic fracturing systems, drilling systems, completion systems, or productions systems.

9. The micro-grid of claim 6, wherein
the micro-grid comprises a second plurality of well sites clustered in a second geographic location, each well site of the second plurality of well sites includes a subsurface hydrocarbon well configured to produce an off-gas output,
the deployable plant is redeployable proximal the second geographic location, and
wherein the deployable plant is configured to produce an industrial chemical output using the off-gas output of the second plurality of well sites and the heat output from the nuclear reactor system or an electrical output derived therefrom.

10. The micro-grid of claim 6, wherein the deployable plant further comprises an electricity off-take unit configured to deliver the electrical output from the deployable nuclear reactor to a local power grid.

11. A method of treating an output of a well site using nuclear reactors, the method comprising
operating a well site, the well site having a subsurface hydrocarbon well;
producing an off-gas output from the hydrocarbon well;
operating a deployable plant deployed proximal to the well site, the deployable plant having a deployable nuclear reactor system and deployable off-gas processing system;
 wherein the deployable off-gas processing system comprises a deployable hydrogen production unit; and
 wherein the deployable off-gas processing system further comprises a deployable chemical production unit;
producing a heat output from the deployable nuclear reactor system;
producing an industrial chemical using the off-gas output of the subsurface hydrocarbon well and the heat output of the deployable nuclear reactor or an electric output derived therefrom;
producing, by the deployable hydrogen production unit, a hydrogen output by performing a steam methane refining process using the off-gas output from the subsurface hydrocarbon well and the heat output from the deployable nuclear reactor or an electrical output derived therefrom; and
producing, by the deployable chemical production unit, a chemical output by performing a Haber-Bosch process or a Fischer-Tropsch process using the hydrogen output from the deployable hydrogen production unit and the heat output from the deployable nuclear reactor or an electrical output derived therefrom.

12. The method of claim 11, wherein
the deployable plant further includes a deployable electrical generation unit, and
the method further comprises producing an electrical power output, by the deployable plant, using the heat output from the deployable nuclear reactor.

13. The method of claim 12, further comprising powering, using the produced electrical output, one or more hydraulic fracturing systems, drilling systems, completion systems, or productions systems associated with the well site.

14. The method of claim 12, wherein
the deployable plant further comprises an electricity off-take unit, and
the method further comprises delivering, using the electricity off-take unit, the produced electrical output from the deployable nuclear reactor to a local power grid.

15. A micro-grid comprising
a plurality of well sites clustered in a first geographic location, each well site of the plurality of well sites includes a subsurface hydrocarbon well configured to produce an off-gas output;
a deployable plant deployed proximal the first geographic location and comprising a deployable nuclear reactor system configured to produce a heat output; and
a network of pipes configured to deliver the off-gas output from each well site of the plurality of well sites to the deployable plant,
wherein the deployable plant is configured to produce an industrial chemical output using the off-gas output and the heat output from the nuclear reactor system or an electrical output derived therefrom;
wherein the micro-grid comprises a second plurality of well sites clustered in a second geographic location, each well site of the second plurality of well sites includes a subsurface hydrocarbon well configured to produce an off-gas output,
the deployable plant is redeployable proximal the second geographic location, and
wherein the deployable plant is configured to produce an industrial chemical output using the off-gas output of the second plurality of well sites and the heat output from the nuclear reactor system or an electrical output derived therefrom.

* * * * *